(12) United States Patent
Imamura et al.

(10) Patent No.: US 9,891,378 B2
(45) Date of Patent: Feb. 13, 2018

(54) CASCADED CORE MULTICORE FIBER AND MANUFACTURING METHOD FOR SAME

(71) Applicants: FURUKAWA ELECTRIC CO., LTD., Tokyo (JP); NIPPON TELEGRAPH AND TELEPHONE CORPORATION, Chiyoda-ku (JP)

(72) Inventors: Katsunori Imamura, Tokyo (JP); Tomohiro Gonda, Tokyo (JP); Ryuichi Sugizaki, Tokyo (JP); Taiji Sakamoto, Tokyo (JP); Takayoshi Mori, Tokyo (JP); Masaki Wada, Tokyo (JP); Takashi Yamamoto, Tokyo (JP); Fumihiko Yamamoto, Tokyo (JP)

(73) Assignees: FURUKAWA ELECTRIC CO., LTD., Tokyo (JP); NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 0 days.

(21) Appl. No.: 15/440,228

(22) Filed: Feb. 23, 2017

(65) Prior Publication Data
US 2017/0160466 A1 Jun. 8, 2017

Related U.S. Application Data

(63) Continuation of application No. PCT/JP2015/075204, filed on Sep. 4, 2015.

(30) Foreign Application Priority Data

Sep. 5, 2014 (JP) ................................ 2014-181747

(51) Int. Cl.
*G02B 6/02* (2006.01)
*G02B 6/028* (2006.01)
(Continued)

(52) U.S. Cl.
CPC .... *G02B 6/02042* (2013.01); *C03B 37/01205* (2013.01); *C03B 37/16* (2013.01); *G02B 6/0288* (2013.01); *C03B 2203/34* (2013.01)

(58) Field of Classification Search
CPC .... G02B 6/02042; G02B 6/0288; G02B 6/02; G02B 6/028; C03B 2203/34; C03B 37/01205; C03B 37/16; C03B 37/012
See application file for complete search history.

(56) References Cited

U.S. PATENT DOCUMENTS 7,574,088 B2* 8/2009 Sugizaki ............ G02B 6/03627
385/100
8,811,787 B2  8/2014 Feuer
(Continued)

FOREIGN PATENT DOCUMENTS

JP  2002-525645   8/2002
JP  2012-203036  10/2012
WO  WO 00/16131   3/2000

OTHER PUBLICATIONS

International Search Report dated Oct. 20, 2015 in PCT/JP2015/075204 filed on Sep. 4, 2015 (with English translation).
(Continued)

*Primary Examiner* — Andrew Jordan
(74) *Attorney, Agent, or Firm* — Oblon, McClelland, Maier & Neustadt, L.L.P.

(57) ABSTRACT

A multicore fiber includes a plurality of unit multicore fibers each including: a plurality of core portions; and a clad portion which is formed in an outer circumference of the core portions and has a refractive index lower than a maximum refractive index of the core portions. The plurality of the core portions have substantially same refractive index profile and different group delays at same wavelength in same propagation mode. The core portions of the multicore fiber are configured so that the core portions of the plurality
(Continued)

of the unit multicore fibers are connected in cascade, a maximum value of differential group delays between the core portions of the multicore fiber is smaller than a reduced value of a maximum value of differential group delays between the core portions of each unit multicore fiber as a value in terms of a length of the multicore fiber.

10 Claims, 21 Drawing Sheets

(51) Int. Cl.
*C03B 37/16* (2006.01)
*C03B 37/012* (2006.01)

(56) References Cited

U.S. PATENT DOCUMENTS

| | | |
|---|---|---|
| 8,995,803 B2 | 3/2015 | Bickham et al. |
| 2013/0136404 A1* | 5/2013 | Feuer ................. G02B 6/02042 385/124 |
| 2013/0216181 A1* | 8/2013 | Bickham ............... G02B 6/268 385/28 |
| 2017/0160466 A1* | 6/2017 | Imamura ............ G02B 6/02042 |

OTHER PUBLICATIONS

Lars Gruner-Nielsen, et al., "Few Mode Transmission Fiber With Low DGD, Low Mode Coupling, and Low Loss", Journal of Lightwave Technology, vol. 30,(23), 2012, 6 pgs.

* cited by examiner

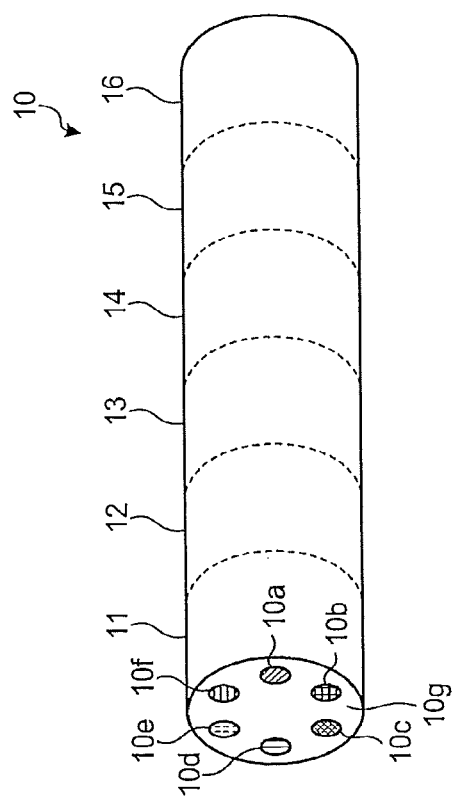

CASCADED CORE MULTICORE FIBER AND MANUFACTURING METHOD FOR SAME

CROSS-REFERENCE TO RELATED APPLICATION

This application is a continuation of PCT International Application No. PCT/JP2015/075204 filed on Sep. 4, 2015 which claims the benefit of priority from Japanese Patent Application No. 2014-181747 filed on Sep. 5, 2014, the entire contents of which are incorporated herein by reference.

BACKGROUND

The present disclosure relates to a multicore fiber and a manufacturing method of the multicore fiber.

In recent years, in order to increase transmission capacity, optical fibers suitable for space division multiplexing (SDM) systems have been developed. A multicore fiber is an example of such an optical fiber. In the multicore fiber, a plurality of independent cores are arranged in one optical fiber, so that the SDM systems may be implemented. On the other hand, in a multimode fiber capable of propagating signal light in a plurality of propagation modes (hereinafter, simply referred to as "modes") in a single core, there is a capability of realizing an increase in communication capacity by mode multiplexing transmission (refer to Lars Gruner-Nielsen, et al. "Few Mode Transmission Fiber With Low DGD, Low Mode Coupling, and Low Loss", J. Lightwave Technol. Vol. 30, No. 23 (2012), pp. 3693-3698.). Herein, since a normal multimode fiber includes a large number of modes, it is difficult to individually control the modes. However, a few-mode fiber where the number of modes is limited to a small number such as about 10 or less has been studied as a new axis of mode multiplexing transmission because all modes may be controlled to be used for propagation (refer to Lars Gruner-Nielsen, et al. "Few Mode Transmission Fiber With Low DGD, Low Mode Coupling, and Low Loss", J. Lightwave Technol. Vol. 30, No. 23 (2012), pp. 3693-3698.). In addition, at present, few-mode propagating multicore fibers for simultaneously realizing space division multiplexing and mode multiplexing have been reported.

The most serious problem in the case of performing the mode multiplexing transmission is treatment of crosstalk signals generated between the modes. For the crosstalk treatment, a MIMO (Multiple Input, Multiple Output) technology has been utilized, where signal light in each mode is separated to be treated.

However, in the case of performing the mode multiplexing transmission, since group velocities in the optical fiber between modes are different, there is a problem in that the amount of signal processing during the MIMO process is increased. In order to solve the problem, efforts are also made to match the group velocities between modes (for example, a base mode and a higher order mode) in a few-mode fiber.

On the other hand, in the case of performing the SDM systems by using a multicore fiber, even if the refractive index profile of each core is designed to be the same so as to realize the same light propagation characteristics in each core, there occurs a difference between the refractive index profiles which are substantially the same, and thus, a difference in group velocity occurs between the cores. In a case where such a multicore fiber is used, if an MIMO process is performed, there may be a problem in that an amount of signal processing during an MIMO process is increased. In addition, in the case of processing signal light coupled with other cores caused by crosstalk, it is necessary to strictly control the group velocity difference between the cores.

There is a need for a multicore fiber and a method of manufacturing the multicore fiber where a differential group delay between core portions is reduced.

SUMMARY

In some embodiments, a multicore fiber includes a plurality of unit multicore fibers each including: a plurality of core portions; and a clad portion which is formed in an outer circumference of the core portions and has a refractive index lower than a maximum refractive index of the core portions, wherein the plurality of the core portions have substantially same refractive index profile and different group delays at same wavelength in same propagation mode, and the core portions of the multicore fiber are configured so that the core portions of the plurality of the unit multicore fibers are connected in cascade, a maximum value of differential group delays between the core portions of the multicore fiber is smaller than a reduced value of a maximum value of differential group delays between the core portions of each unit multicore fiber as a value in terms of a length of the multicore fiber.

In some embodiments, a method of manufacturing a multicore fiber includes: preparing a plurality of unit multicore fibers including a plurality of core portions and a clad portion which is formed in an outer circumference of the core portions and has a refractive index lower than a maximum refractive index of the core portions, the plurality of the core portions having substantially the same refractive index profile and different group delays at the same wavelength in the same propagation mode; and manufacturing the multicore fiber by connecting the core portions of the plurality of the unit multicore fibers in cascade, and the core portions of the plurality of the unit multicore fibers are connected in cascade so that a maximum value of differential group delays between the core portions of the multicore fiber is smaller than a reduced value of a maximum value of differential group delays between the core portions of each unit multicore fiber as a value in terms of a length of the multicore fiber.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 2A is a diagram illustrating the configuration of the multicore fiber illustrated in FIG. 1A;

DETAILED DESCRIPTION

Figure 1A:
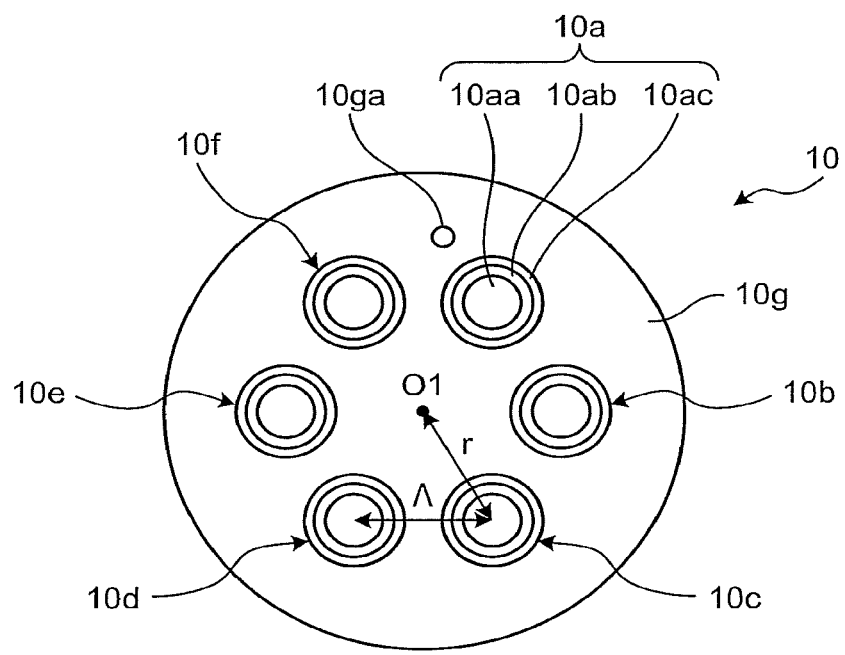
FIG. 1A is a diagram illustrating a configuration of a multicore fiber according to a first embodiment.

Hereinafter, embodiments of a multicore fiber and a method of manufacturing the multicore fiber according to the present disclosure will be described in detail with reference to the drawings. The present disclosure is not limited to the embodiments. In addition, in each figure, the same or corresponding elements are appropriately denoted by the same reference numerals. Furthermore, it should be noted that the figures are schematic ones and, in some cases, relationships or the like among dimensions of the elements may be different from the actual ones. In some cases, between the figures, portions having different relationships or ratios of dimensions may be included. In addition, terms which are not particularly defined in this specification are in accordance with definitions and measurement methods in ITU-T (International Telecommunication Union Telecommunication Standardization Sector) G. 650.1.

First Embodiment

Figure 1B:
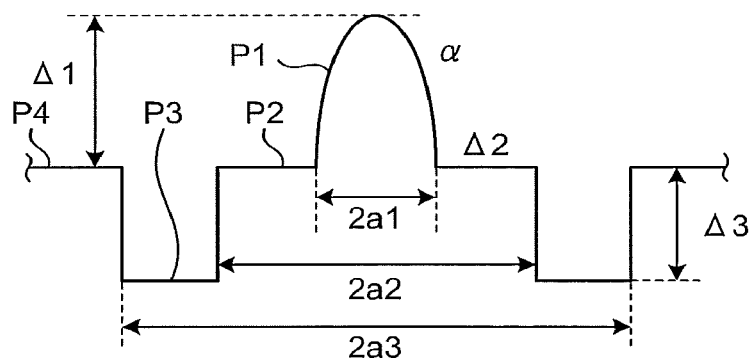
FIG. 1B is a diagram illustrating a refractive index profile of the multicore fiber according to the first embodiment.

FIG. 1A is a diagram illustrating a configuration of a multicore fiber according to a first embodiment, and FIG. 1B is a diagram illustrating a refractive index profile of the multicore fiber according to the first embodiment. As illustrated in FIG. 1A, a multicore fiber 10 is configured to include a plurality (six in the first embodiment) of core portions 10a, 10b, 10c, 10d, 10e, and 10f, a clad portion 10g which is formed in the outer circumference of the core portions 10a to 10f and has a refractive index lower than the maximum refractive index of the core portions 10a to 10f, and a marker 10ga which is formed in the clad portion 10g and is arranged at a position capable of identifying positions of the core portions 10a to 10f. The core portions 10a to 10f are arranged at positions in an equal distance r from the central axis O1 of the clad portion 10g at an equal angle to form a circle centered on the central axis O1. Namely, the core portions 10a to 10f are arranged to have 6-fold rotational symmetry. The center distance (core pitch) between the adjacent core portions is Λ.

As illustrated in FIGS. 1A and 1B, the core portion 10a is configured to include a center core portion 10aa which has the maximum refractive index of the core portion 10a and a refractive index profile P1 of α power, an inner core layer 10ab which is formed in the outer circumference of the center core portion 10aa and has a refractive index profile P2 where the refractive index is substantially the same as the refractive index of the clad portion 10g, and an outer core layer 10ac which is formed in the outer circumference of the inner core layer 10ab and has a refractive index profile P3 where the refractive index is lower than the refractive index of the clad portion 10g. A refractive index profile P4 denotes the refractive index profile of the clad portion 10g. In addition, the radius of the center core portion 10aa is denoted by a1 (namely, the diameter is denoted by 2a1), and the maximum value of the relative refractive-index difference with respect to the clad portion 10g is denoted by Δ1. The radius of the inner core layer 10ab is denoted by a2 (namely, the diameter is denoted by 2a2), and the average value of the relative refractive-index difference with respect to the clad portion 10g is denoted by Δ2. The radius of the outer core layer 10ac is denoted by a3 (namely, the diameter is denoted by 2a3), and the average value of the relative refractive-index difference with respect to the clad portion 10g is denoted by Δ3. In this manner, the multicore fiber 10 has a trench-type refractive index profile.

In addition, when the maximum refractive index of the center core portion 10aa is denoted by n1, the refractive index of the clad portion 10g is denoted by n0, and the radial distance from the center of the center core portion 10aa is denoted by r, the α-powered refractive index profile of the center core portion 10aa is expressed by the following Mathematical Formula. In addition, "^" is a symbol indicating exponentiation.

$$n^2(r)=n1^2-(n1^2-n0^2)\cdot(r/a1)^\wedge\alpha$$

For example, a refractive index distribution profile of which value of α is 3 may be referred to as an α-powered refractive index distribution profile of which value of α is 3.

The center core portion 10aa is made of, for example, a quartz glass doped with germanium (Ge) as dopants increasing the refractive index. The inner core layer 10ab is made of, for example, a quartz glass which does not almost contain dopants for adjusting the refractive index or a pure quartz glass which does not contain dopants for adjusting the refractive index. The outer core layer 10ac is made of, for example, a quartz glass doped with, for example, fluorine (F) as dopants decreasing the refractive index. The clad portion 10g is made of, for example, a pure quartz glass which does not contain dopants for adjusting the refractive index. The marker 10ga is made of a glass, a colored glass, or the like having a refractive index different from that of the clad portion 10g. In addition, a coat may be formed on the outer circumference of the clad portion 10g.

The other core portions 10b to 10f are also made of the same material as that of the core portion 10a and has the same configuration. Namely, each of the core portions is configured to include a center core portion which has the maximum refractive index and has a refractive index distribution profile of α power, an inner core layer which is formed on the outer circumference of the center core portion and has a refractive index being substantially the same as the refractive index of the clad portion, and an outer core layer which is formed on the outer circumference of the inner core layer and has a refractive index being lower than the refractive index of the clad portion.

Figure 2B:
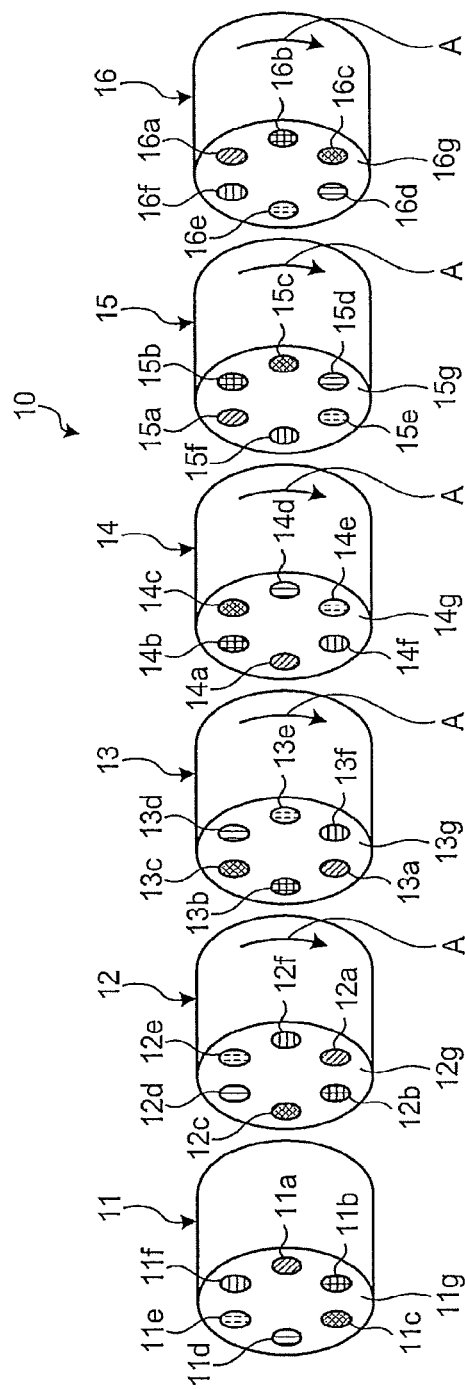
FIG. 2B is a diagram illustrating the configuration of the multicore fiber illustrated in FIG. 1A.

FIGS. 2A and 2B are diagram illustrating the configuration of the multicore fiber 10 illustrated in FIG. 1A. As illustrated in FIG. 2A, the multicore fiber 10 is configured so that a plurality (six in the first embodiment) of unit multicore fibers 11, 12, 13, 14, 15, and 16 are connected in cascade.

The unit multicore fibers 11, 12, 13, 14, 15, and 16 are manufactured by cutting an original multicore fiber which is manufactured with lines being continuously drawn and has a length substantially the same as or larger than that of the multicore fiber 10 into six equal-length fibers and have configurations similar to that of the multicore fiber 10. Namely, as illustrated in FIG. 2B, for example, the unit multicore fiber 11 is configured to include a plurality (six in the first embodiment) of core portions 11a, 11b, 11c, 11d, 11e, and 11f, a clad portion 11g which is formed in the outer circumference of the core portions 11a to 11f and has a refractive index lower than the maximum refractive index of the core portions 11a to 11f, and a marker (not illustrated) which is formed in the clad portion 11g and is arranged at a position capable of identifying positions of the core portions 11a to 11f. The core portions 11a to 11f are arranged at positions in a substantially equal distance from the central axis of the clad portion 11g to form a circle centered on the central axis. In addition, each of the core portions 11a to 11f is configured to include a center core portion which has the maximum refractive index of each core portion and has a α-powered refractive index distribution profile, an inner core layer which is formed on the outer circumference of the center core portion and has a refractive index being substantially the same as that of the clad portion, and an outer core layer which is formed on the outer circumference of the inner core layer and has a refractive index being lower than the refractive index of the clad portion.

The other unit multicore fibers 12 to 16 also have similar configurations. Namely, the unit multicore fibers 12 to 16 are configured to include core portions 12a to 12f, a clad portion 12g, and a marker, core portions 13a to 13f, a clad portion 13g, and a marker, core portions 14a to 14f, a clad portion 14g, and a marker, core portions 15a to 15f, a clad portion 15g, and a marker, and core portions 16a to 16f, a clad portion 16g, and a marker, respectively. Herein, for example, the core portions 11a, 12a, 13a, 14a, 15a, and 16a are continuous with each other before cutting into the unit multicore fibers. The core portions 11b to 16b (the core portions 11c to 16c, the core portions 11d to 16d, the core portions 11e to 16e, the core portions 11f to 16f) are continuous with each other before cutting into the unit multicore fibers.

All the core portions of each of the unit multicore fibers 11 to 16 have refractive index profiles of which shapes are substantially the same as that illustrated in FIG. 1B, and the parameters a1, a2, a3, α, Δ1, Δ2, and Δ3 indicating the refractive index profile are substantially the same as those illustrate in the figure. Such parameters are set so that, in a wavelength of input light (for example, light of C band (1530 nm to 1565 nm) or L band (1565 nm to 1610 nm) as a wavelength band used for optical communication), propagation modes of two modes (LP01 mode and LP11 mode) exist in each core portion. In addition, the value of α is set so that group velocity difference between the two modes is small, and Δ3 is set so that bending loss in a higher-order mode is suppressed.

Herein, the situation where the refractive index profiles are substantially the same denotes that, for example, among the parameters, Δ1, Δ2, and Δ3 are in a range of ±0.05%, a1, a2, and a3 are in a range of ±0.5 µm, and the value of α is in a range of ±0.3. Such a situation occurs in a case where, although an original multicore fiber is manufactured by setting each of the core portions so as to have the same refractive index profile, the parameters of the original multicore fiber have deviation due to manufacturing errors or the like. In some cases, such deviation may occur between the core portions, or even in a continuous core portion, such deviation may occur in the longitudinal direction.

Herein, the configuration of the multicore fiber 10 will be described more in detail. As illustrated in the exploded diagram of FIG. 2B, each core portion of the multicore fiber 10 is configured so that the core portions of the unit multicore fiber are connected in cascade. Specifically, the core portion 10a of the multicore fiber 10 is configured so that the core portion 11a of the unit multicore fiber 11, the core portion 12f of the unit multicore fiber 12, the core portion 13e of the unit multicore fiber 13, the core portion 14d of the unit multicore fiber 14, the core portion 15c of the unit multicore fiber 15, and the core portion 16b of the unit multicore fiber 16 are connected in cascade.

In addition, the core portion 10b of the multicore fiber 10 is configured so that the core portion 11b, the core portion 12a, the core portion 13f, the core portion 14e, the core portion 15d, and the core portion 16c are connected in cascade. The core portion 10c of the multicore fiber 10 is configured so that the core portion 11c, the core portion 12b, the core portion 13a, the core portion 14f, the core portion 15e, and the core portion 16d are connected in cascade. The core portion 10d of the multicore fiber 10 is configured so that the core portion 11d, the core portion 12c, the core portion 13b, the core portion 14a, the core portion 15f, and the core portion 16e are connected in cascade. The core portion 10e of the multicore fiber 10 is configured so that the core portion 11e, the core portion 12d, the core portion 13c, the core portion 14b, the core portion 15a, and the core portion 16f are connected in cascade. The core portion 10f of the multicore fiber 10 is configured so that the core portion 11f, the core portion 12e, the core portion 13d, the core portion 14c, the core portion 15b, and the core portion 16a are connected in cascade.

In addition, the clad portion 10g of the multicore fiber 10 is configured so that the clad portions 11g, 12g, 13g, 14g, 15g, and 16g are connected in cascade.

The multicore fiber 10 may be manufactured by manufacturing the unit multicore fibers 11, 12, 13, 14, 15, and 16 by cutting the original multicore fiber which is manufactured with lines being continuously drawn as described above and by rotating the unit multicore fibers by 60° around the axis in the rotational direction indicated by arrow A in FIG. 2B and fusion-splicing these unit multicore fibers. In the original multicore fiber, the markers are continuous over the entire length. However, in the multicore fiber 10 obtained by manufacturing the unit multicore fibers 11, 12, 13, 14, 15, and 16 by cutting and by rotating the unit multicore fibers around the axis and fusion-splicing the unit multicore fibers, the markers of the unit multicore fibers 11, 12, 13, 14, 15, and 16 are located at different positions rotated around the axis.

Herein, as described above, all the core portions of each of the unit multicore fibers 11 to 16 have substantially the same refractive index profiles and substantially the same optical characteristics (for example, effective area, group delay, and the like of each propagation mode), but since these are not completely the same, for example, if the unit multicore fiber 11 is described, the core portions 11a to 11f have different group delays at the same wavelength in the same propagation mode, namely, there is the differential group delay between the core portions. In addition, the differential group delay between the different propagation modes at the same wavelength is also different among the core portions 11a to 11f. In the other unit multicore fibers, similar configuration is also applied. As described above, in a case where there is the differential group delay between the core portions in this manner, if SDM systems are used, there may be a problem in that the amount of signal processing during the MIMO process is increased.

On the contrary, since the multicore fiber 10 according to the first embodiment has the above-described configuration, for example, light (for example, signal light) input to the core portion 10a sequentially passes through the core portion 11a of the unit multicore fiber 11, the core portion 12f of the unit multicore fiber 12, the core portion 13e of the unit multicore fiber 13, the core portion 14d of the unit multicore fiber 14, the core portion 15c of the unit multicore fiber 15, and the core portion 16b of the unit multicore fiber 16. In this case, for example, unlike a case where the signal light propagates the core portion 11a of the unit multicore fiber 11 by length corresponding to the multicore fiber 10, the signal light propagates based on the refractive index profiles of the six core portions which are different core portions in the original multicore fiber. Unlike a case where the signal light propagates a certain core portion of the unit multicore fiber by length corresponding to the multicore fiber 10, the signal light input to the other core portions 10b to 10f also propagates based on the refractive index profiles of the six core portions which are different core portions in the original multicore fiber. Therefore, the differential group delay between the core portions 10a to 10f becomes smaller than the value of a case where the signal light propagates the unit multicore fiber by length corresponding to the multicore fiber 10. As a result, the maximum value of the differential group delay between the core portions 10a to 10f is smaller than a reduced value of the maximum value of the differential group delay between the core portions each of the unit multicore fibers 11 to 16 as the value in terms of the length of the multicore fiber 10. In addition, more preferably, the maximum value of the differential group delay between the core portions 10a to 10f is smaller than a reduced value of the minimum value of the differential group delay between the core portions each of the unit multicore fibers 11 to 16 as the value in terms of the length of the multicore fiber 10. Furthermore, preferably, the differential group delay between the core portions 10a to 10f is decreased to approach zero.

In addition, from the point of view of the burden of the MIMO process, the maximum value of the differential group delay of the multicore fiber 10 is preferably smaller than 5 ns from the total length, more preferably equal to or smaller than 3 ns, further more preferably equal to or smaller than 2 ns.

In addition in the multicore fiber 10 according to the first embodiment, the core portions 10a to 10f are arranged to have 6-fold rotational symmetry. If the core portion are arranged to have n-fold rotational symmetry (n is an integer of 2 or more) in this manner, since the differential group delay between the core portions may be decreased by rotating the unit multicore fibers around the axis and fusion-splicing the unit multicore fibers, the arrangement is preferred.

Herein, as described above, in a case where the multicore fiber 10 is manufactured by rotating the unit multicore fibers 11, 12, 13, 14, 15, and 16 around the axis and fusion-splicing the unit multicore fibers, the number of splicing positions is increased. In the case of using a typical single-core fiber, splice loss caused by axial misalignment between the core portions may be suppressed. However, in the multicore fiber, since a plurality of the core portions are cyclically spliced, the position accuracy of the core portions greatly affects the splice loss.

As parameters of determining position misalignment of the core portions, a distance r between the center of the clad portion and the center of the core portion and an angle (namely, angle deviation) θ between a straight line connecting the core portion center and the clad portion center and a straight line connecting the core portion center connected to the associated core portion and the clad portion center are checked. A fusion splicing device capable of rotating the optical fiber around the central axis and fusion-splicing the optical fiber rotates the optical fiber by using a typical step motor or the like. Although the rotation adjustment accuracy is about 0.2°, an actual amount of angle misalignment including manufacturing errors becomes about 2°. On the other hand, it is well known that, in a single-mode optical fiber having a zero-dispersion wavelength in a typical band of 1.3 μm in accordance with ITU-T G. 652 a mode field diameter (MFD) at a wavelength of 1310 nm is about 9.2 μm, and splice loss caused by fusion-splicing is defined by the MFD like Mathematical Formula (1) and an amount of axial misalignment between the fusion-spliced core portions. Herein, d is the amount of axial misalignment between the fusion-spliced core portions, $w_1$ and $w_2$ are diameters of spot sizes of the respective fusion-spliced core portions as amounts of half values of the MFDs of the respective core portions.

[Mathematical Formula 1]

$$\text{Loss} = -10 \times \log\left[\left(\frac{2w_1 w_2}{w_1^2 + w_2^2}\right)^2 \exp\left(-\frac{2d^2}{w_1^2 + w_2^2}\right)\right] \quad (1)$$

Herein, in the embodiment, since cascade connection of a plurality of the core portions is performed, it is preferable that the splice loss at each connection portion is small, it is preferable that the splice loss is 0.5 dB or less, it is more preferable that the splice loss is 0.1 dB or less. Herein, if only the amount of axial misalignment (position alignment between the core portions) between the core portions caused by the angle misalignment is considered, the relationship among r, θ, and d described above may be expressed by the following Mathematical Formula (2).

[Mathematical Formula 2]

$$d = r*[(1-\cos\theta)^2 + \sin\theta^2]^{0.5} \quad (2)$$

Figure 3:
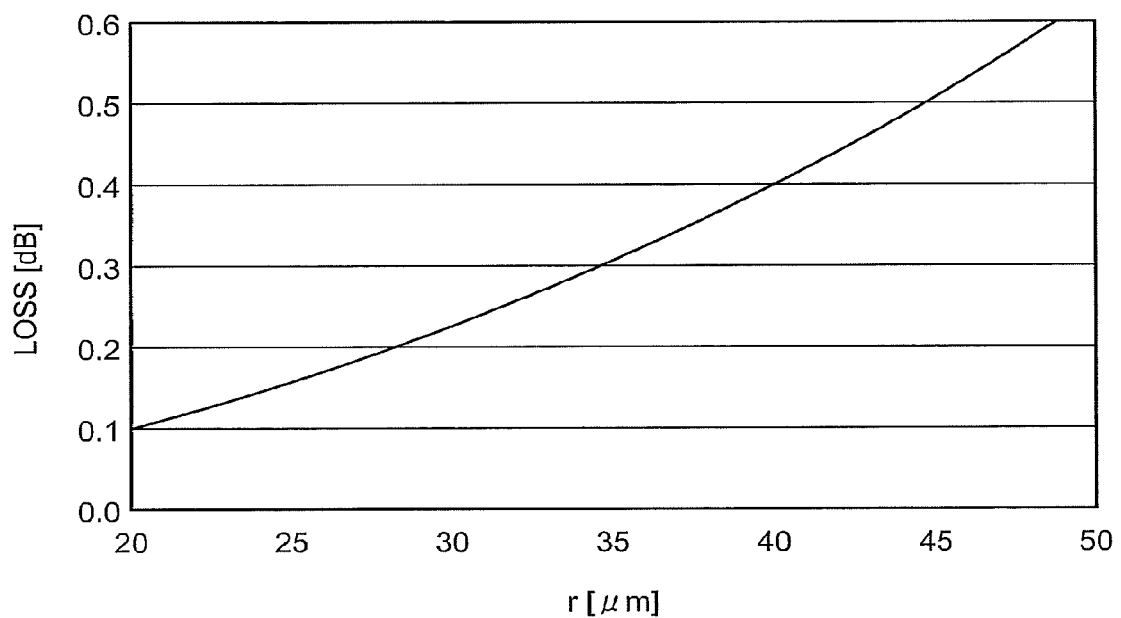
FIG. 3 is a diagram illustrating a relationship between a distance from a center of a clad portion to a center of a core portion of a multicore fiber and loss.

As understood from Mathematical Formula (2), it may be understood that the distance r of the core portion center from clad portion center is the only parameters of determining the position misalignment of the core portion caused by the angle misalignment. In addition, FIG. 3 is a diagram illustrating the relationship between the distance r and the splice loss in a case where Mathematical Formula (2) is inserted into Mathematical Formula (1), the MFD is set to 9.2 μm, and the amount of angle misalignment θ is set to 2°. Therefore, in order to set the splice loss to be 0.5 dB or less, it is preferable that the distance r is set to be 45 μm or less, and in order to set the splice loss to be 0.1 dB or less, it is preferable that the distance r is set to be 20 μm or less.

Example and Comparative Example

The present disclosure will be described in detail by using Examples and Comparative Example. First, an original multicore fiber having the same configuration and refractive index profile as those of the first embodiment and having a length of 10.1 km is manufactured with lines being continuously drawn. In order to propagate light having a wavelength in a band of 1.55 μm in two modes of LP01 mode and LP11 mode and with sufficiently low crosstalk in each core portion, the original multicore fiber is manufactured so that, as design parameters, $\Delta 1$ is 0.82%, α is 2, $\Delta 2$ is 0%, $\Delta 3$ is −0.46%, a1 is 7.3 μm, a2 is 9.1 μm, a3 is 13.4 μm, and core pitch $\Lambda$ is 30 μm, and a clad diameter is 125 μm.

Figure 4:
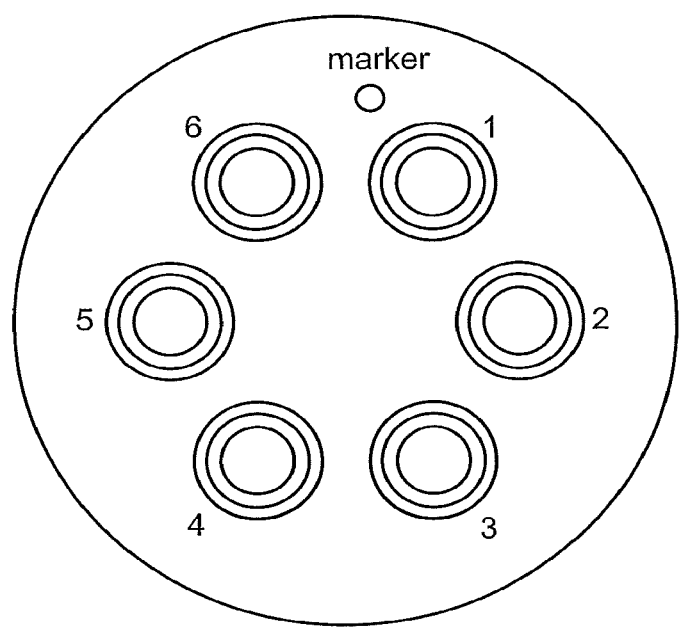
FIG. 4 is a schematic diagram illustrating a cross section of a manufactured original multicore fiber.
Figure 5:
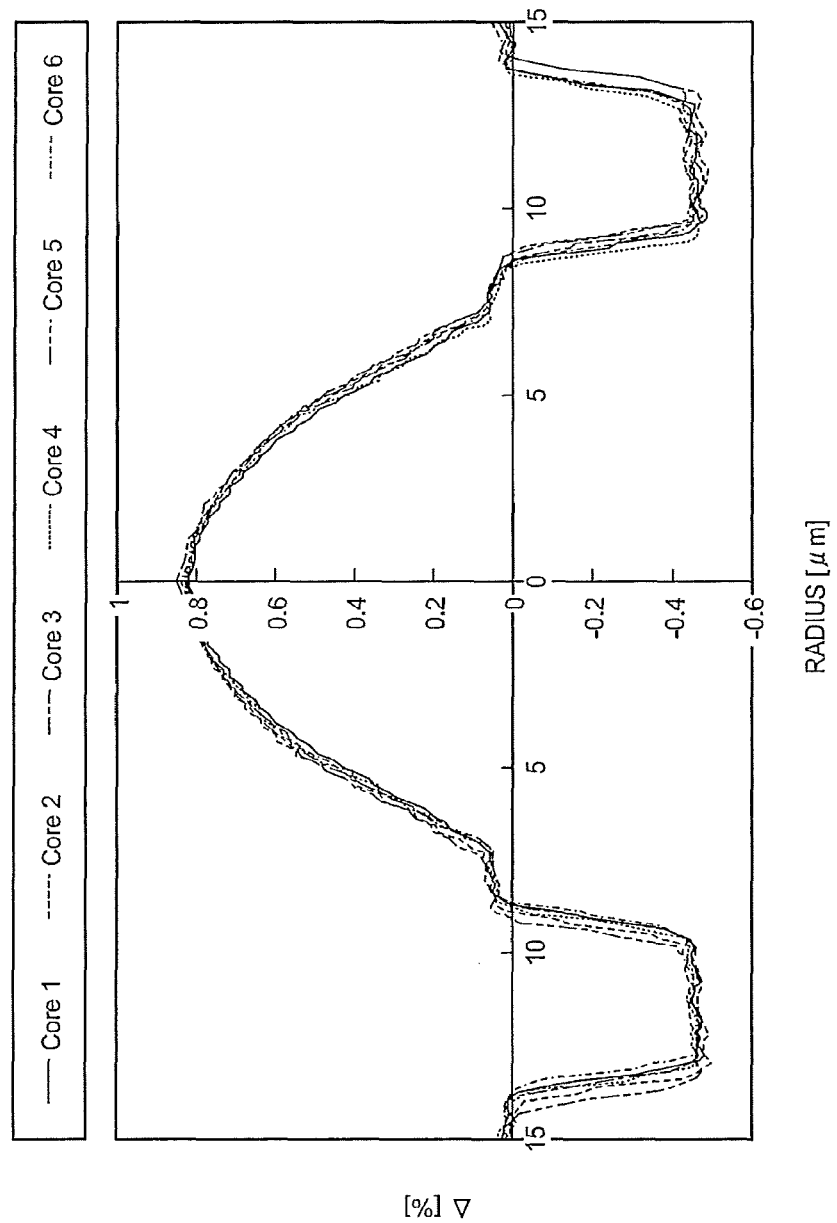
FIG. 5 is a diagram illustrating a refractive index profile of the manufactured original multicore fiber.

FIG. 4 is a schematic diagram illustrating a cross section of the manufactured original multicore fiber. Herein, as illustrated in FIG. 4, each core portion is denoted by an ID number. FIG. 5 is a diagram illustrating a refractive index profile of the manufactured original multicore fiber. In FIG. 5, "Core 1" indicates the refractive index profile of the core portion denoted by the ID number "1" in FIG. 4.

Table 1 is a table listing the parameters of the manufactured core portions. As illustrated in FIG. 5 and Table 1, due to the manufacturing errors and the like, with respect to each core portion, $\Delta 1$ varies in a range of 0.025%, α varies in a range of 0.13, $\Delta 2$ varies in a range of 0.005%, $\Delta 3$ varies in a range of −0.025%, a1 varies in a range of 0.40 μm, a2 varies in a range of 0.35 μm, and a3 varies in a range of 0.45 μm. However, the core portions have substantially the same refractive index profiles according to the design parameters.

TABLE 1

| Core ID | Δ[%] | | | | Radius [μm] | | |
|---|---|---|---|---|---|---|---|
| | Δ1 | Δ2 | Δ3 | α | a1 | a2 | a3 |
| 1 | 0.805 | 0.055 | −0.46 | 2 | 7.1 | 9.05 | 13.3 |
| 2 | 0.815 | 0.05 | −0.475 | 2.08 | 7.3 | 9.3 | 13.6 |
| 3 | 0.83 | 0.05 | −0.46 | 2 | 7.15 | 9.1 | 13.3 |
| 4 | 0.82 | 0.05 | −0.46 | 1.98 | 7.1 | 9 | 13.3 |
| 5 | 0.815 | 0.055 | −0.45 | 1.95 | 7.5 | 9.35 | 13.75 |
| 6 | 0.82 | 0.055 | −0.45 | 1.98 | 7.2 | 9.05 | 13.3 |

Table 2 is a table listing optical characteristics of the core portions obtained by simulation based on the refractive index profiles of the manufactured core portions. Table 2 lists effective areas (Aeff) and effective refractive index (neff) of the core portions at a wavelength of 1550 nm.

TABLE 2

| Core ID | Aeff [μm²] | | Wavelength: 1550 nm neff | |
|---|---|---|---|---|
| | LP01 | LP11 | LP01 | LP11 |
| 1 | 62.7 | 131.4 | 1.45171 | 1.44755 |
| 2 | 64.5 | 132.6 | 1.45204 | 1.44797 |

TABLE 2-continued

| Core ID | Aeff [μm²] | | Wavelength: 1550 nm neff | |
|---|---|---|---|---|
| | LP01 | LP11 | LP01 | LP11 |
| 3 | 62.1 | 129.5 | 1.45203 | 1.44782 |
| 4 | 62.0 | 130.2 | 1.45186 | 1.44764 |
| 5 | 65.2 | 135.5 | 1.45199 | 1.44797 |
| 6 | 65.3 | 135.6 | 1.45209 | 1.44807 |

Figure 6:
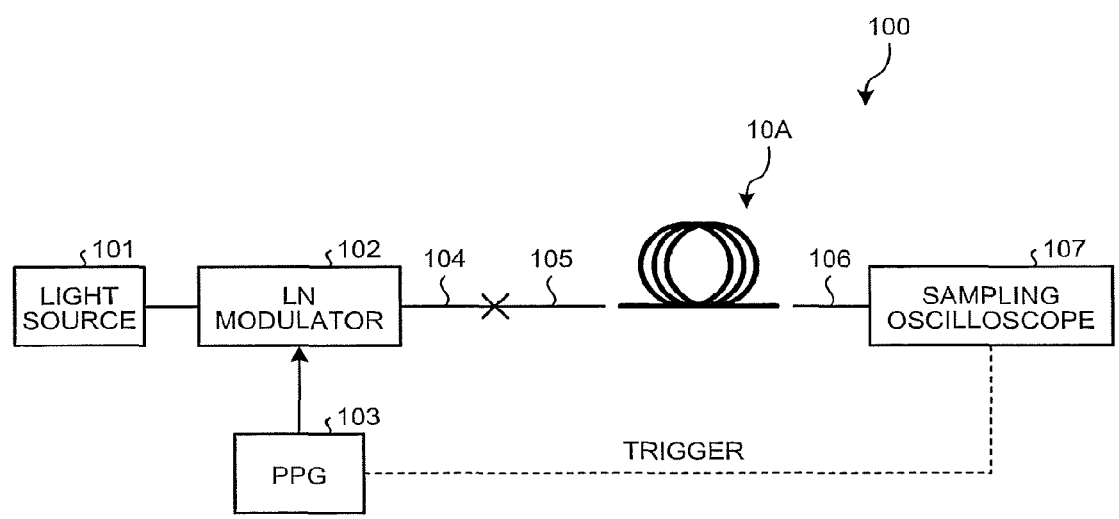
FIG. 6 is a diagram illustrating a measurement system for group delay in a core portion of the manufactured original multicore fiber.

Next, group delays of light having a wavelength of 1530 nm and light having a wavelength of 1570 nm in the LP01 and LP11 modes of each of the core portions of the original multicore fiber are measured. FIG. 6 is a diagram illustrating a measurement system of the group delay of the core portion of the manufactured original multicore fiber. A measurement system 100 generates test light by modulating continuous laser light output from a light source 101 by using an LN modulator 102, inputs the test light to each core portion of the original multicore fiber 10A though a typical single-mode optical fiber 104 and a highly-nonlinear optical fiber 105 having a mode field diameter smaller than that of the single-mode optical fiber 104, and inputs the test light which propagates the core portion and is output from the core portion to a sampling oscilloscope 107 through a single-mode optical fiber 106. Herein, the LN modulator 102 modulates a signal output from a pulse pattern generator (PPG) 103 to a modulation signal, and a trigger signal from the pulse pattern generator 103 is input to the sampling oscilloscope 107. For example, by setting a modulation frequency of the test light input to each core portion of the original multicore fiber 10A to be 100 MHz and setting a pulse width of the test light to be 1.5 ns, the LP01 mode and the LP11 mode of each core portion may be identified. Therefore, the group delay of each core portion of the original multicore fiber 10A may be measured.

Table 3 lists differential group delay and DMD (Differential Mode Delay) of the original multicore fiber measured on the basis of the measured group delays. Herein, the differential group delay is defined as a difference of the group delay in the LP11 mode at a wavelength of 1530 nm of Core 1 that is the condition of the smallest group delay. Herein, for example, if the wavelength is 1530 nm, the largest differential group delay is the value in the LP01 mode of Core 6. In addition, the DMD is defined as a differential group delay per unit length between different modes of the same core portion at the same wavelength. For example, the DMD of Core 1 at a wavelength of 1530 nm is (0.00−4.97)/10.1=−0.492 ns/km=−492 ps/km. It may be understood from Table 2 that the absolute value of the DMD is largest in Core 1 and smallest in Core 3, and the absolute value of the DMD of each core portion is within 1000 ps/km. In addition, the maximum DMD is defined as a maximum value of a differential group delay per unit length between different modes between different core portions at the same wavelength. For example, the DMD at a wavelength of 1530 nm is (0.00−10.41)/10.1=−1.031 ns/km=−1031 ps/km. In this manner, in the manufactured original multicore fiber, since the maximum DMD per 1 km exceeds 1 ns, the maximum DMD exceeds 2 ns at a length of 2 km, and the maximum DMD exceeds 10 ns at a length of 10 km.

TABLE 3

| Item | Wavelength | Mode | Unit | Core 1 | Core 2 | Core 3 | Core 4 | Core 5 | Core 6 | Maximum DMD |
|---|---|---|---|---|---|---|---|---|---|---|
| Differential group delay (10.1 km) | 1530 nm | LP01 | ns | 4.97 | 7.83 | 8.02 | 8.85 | 6.07 | 10.41 | |
| | | LP11 | ns | 0.00 | 5.02 | 6.61 | 5.17 | 2.06 | 6.04 | |
| | 1550 nm | LP01 | ns | 8.36 | 11.44 | 11.72 | 13.04 | 9.34 | 14.13 | |
| | | LP11 | ns | 3.20 | 8.37 | 10.18 | 8.84 | 5.11 | 9.38 | |
| | 1570 nm | LP01 | ns | 12.52 | 15.68 | 15.64 | 16.29 | 13.41 | 18.55 | |
| | | LP11 | ns | 7.02 | 12.20 | 13.74 | 11.86 | 8.88 | 13.39 | |
| DMD | 1530 nm | LP11-LP01 | ps/km | −492 | −278 | −140 | −364 | −397 | −433 | −1031 |
| | 1550 nm | LP11-LP01 | ps/km | −511 | −304 | −152 | −416 | −418 | −470 | −1083 |
| | 1570 nm | LP11-LP01 | ps/km | −544 | −345 | −187 | −439 | −510 | −510 | −1141 |

Next, six unit multicore fibers are manufactured by cutting the original multicore fiber by 1 km. Next, first, as Comparative Example, a multicore fiber configured so that the unit multicore fibers are connected in cascade is manufactured by fusion-splicing the unit multicore fibers without rotation around an axis. Next, group delays of the manufactured multicore fiber are measured.

Figure 7:
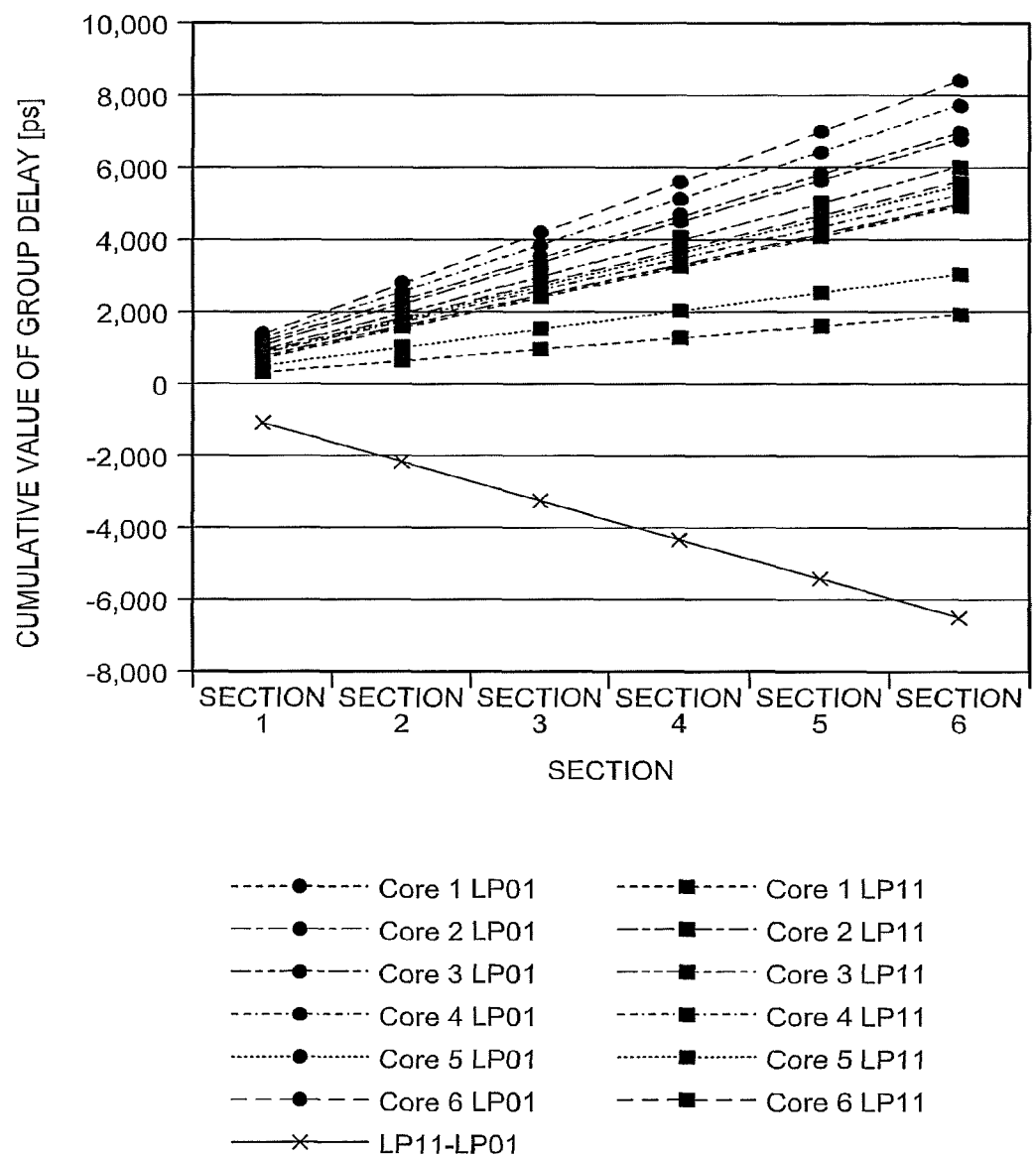
FIG. 7 is a diagram illustrating a cumulative group delay in a multicore fiber of Comparative Example.

FIG. 7 is a diagram illustrating a cumulative group delay in a multicore fiber according to Comparative Example. Herein, a cumulative group delay denotes a group delay cumulated in the longitudinal direction. In addition, sections in the horizontal axis correspond to the unit multicore fibers. The test light from the unit multicore fiber corresponding to Section 1 is input. The cumulative group delay of Section 6 corresponds to the group delay over the entire length. In addition, "Core 1 LP01" is the cumulative group delay in the LP01 mode of Core 1. "LP11-LP01" is the maximum value of the cumulative differential group delay between different core portions. In addition, the wavelength is 1550 nm. As illustrated in FIG. 7, in the multicore fiber of Comparative Example, the absolute value of the cumulative value (the maximum value of the differential group delay between the core portions over the entire length) of the DMD between the LP11 and LP01 modes is larger than 6000 ps (6 ns) and becomes a greatly large value.

Next, as Example 1, a multicore fiber configured so that the unit multicore fibers are connected in cascade is manufactured by cutting an original multicore fiber by 1 km to manufacture six unit multicore fibers and by rotating the first to sixth unit multicore fibers by 60° around the axis and clockwise and fusion-splicing the six unit multicore fibers. In the multicore fiber, the core portions of the first to sixth unit multicore fibers are connected from Section 1 to Section 6, for example, like Core 1→Core 2→Core 3→Core 4→Core 5→Core 6. Next, the group delay of the manufactured multicore fiber is measured.

Figure 8:
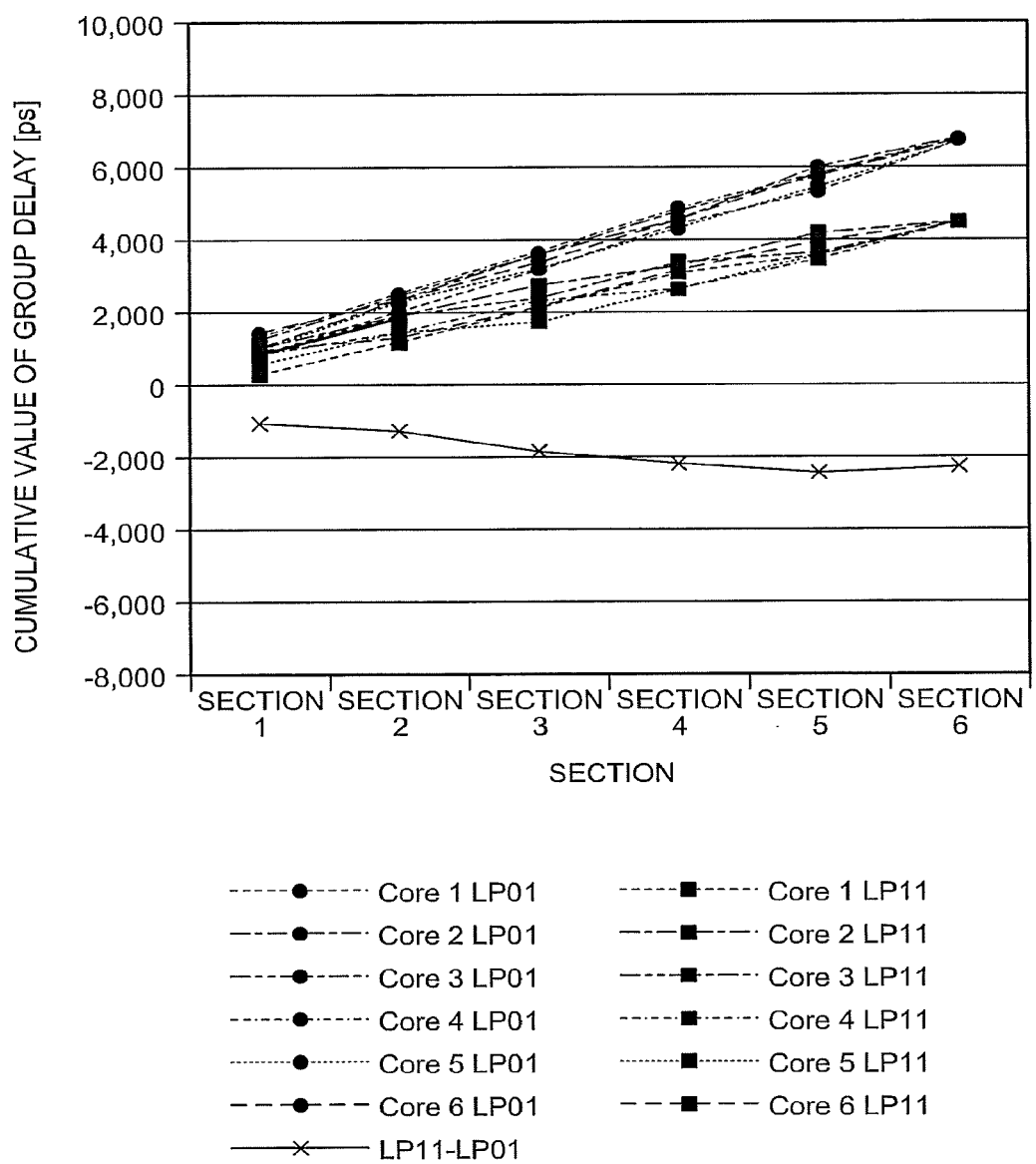
FIG. 8 is a diagram illustrating a cumulative group delay in a multicore fiber according to Example 1.

FIG. 8 is a diagram illustrating a cumulative group delay in a multicore fiber according to Example 1. The wavelength is 1550 nm. As illustrated in FIG. 8, in the multicore fiber of Example 1, the absolute value of the cumulative value of the DMD between the LP11 and LP01 modes becomes 2500 ps (2.5 ns) or less, and thus, the value is greatly decreased in comparison with Comparative Example. Namely, in Example 1, the maximum value of the differential group delay between the core portions of the multicore fiber over the entire length becomes smaller than the maximum value (corresponding to a reduced value of the maximum value of the differential group delay between the core portions of each unit multicore fiber as the value in terms of the length of the multicore fiber of Example 1) of the differential group delay between the core portions of the multicore fiber of Comparative Example.

Next, as Example 2, a multicore fiber configured so that the unit multicore fibers are connected in cascade is manufactured by cutting an original multicore fiber by 1 km to manufacture six unit multicore fibers and by rotating the second unit multicore fiber by 180° around the axis and clockwise and fusion-splicing the second unit multicore fiber to the first unit multicore fiber; rotating the third unit multicore fiber by 240° around the axis and clockwise and fusion-splicing the third unit multicore fiber to the second unit multicore fiber; rotating the fourth unit multicore fiber by 180° around the axis and clockwise and fusion-splicing the fourth unit multicore fiber to the third unit multicore fiber; rotating the fifth unit multicore fiber by 240° around the axis and clockwise and fusion-splicing the fifth unit multicore fiber to the fourth unit multicore fiber; and rotating the sixth unit multicore fiber by 180° around the axis and clockwise and fusion-splicing the sixth unit multicore fiber to the fifth unit multicore fiber. In the multicore fiber, the core portions of the first to sixth unit multicore fibers are connected from Section 1 Section 6, for example, like Core 1→Core 4→Core 2→Core 5→Core 3→Core 6. Next, the group delay of the manufactured multicore fiber is measured.

Figure 9:
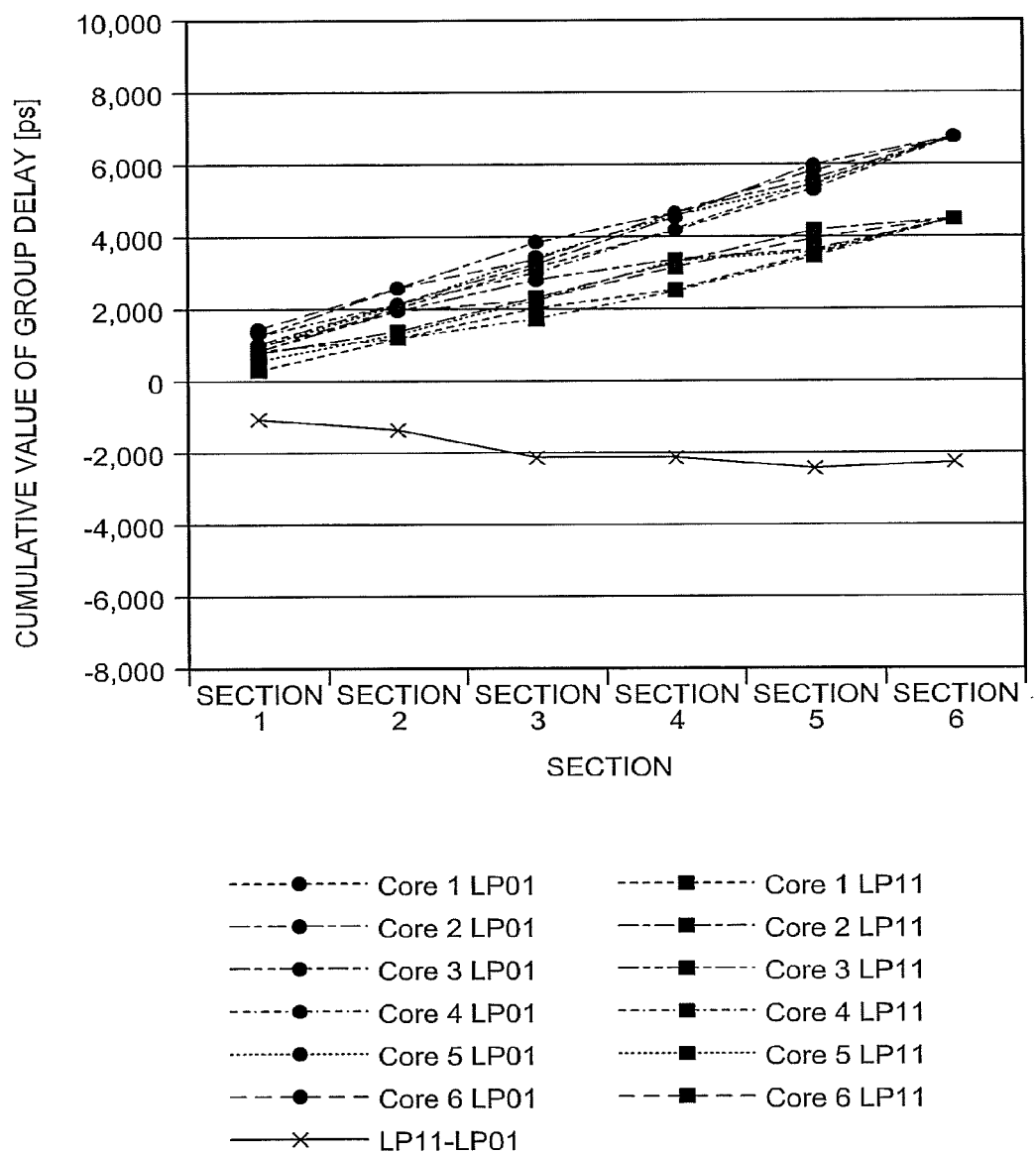
FIG. 9 is a diagram illustrating a cumulative group delay in a multicore fiber according to Example 2.

FIG. 9 is a diagram illustrating a cumulative group delay in a multicore fiber according to Example 2. The wavelength is 1550 nm. As illustrated in FIG. 9, in the multicore fiber of Example 2, the absolute value of the cumulative value of the DMD between the LP11 and LP01 modes becomes 2500 ps (2.5 ns) or less, and thus, the value is greatly decreased in comparison with Comparative Example.

Next, as Example 3, a multicore fiber configured so that the unit multicore fibers are connected in cascade is manufactured by cutting an original multicore fiber by 1 km to manufacture six unit multicore fibers and by reversing the second unit multicore fiber in the longitudinal direction and fusion-splicing the second unit multicore fiber to the first unit multicore fiber; rotating the third unit multicore fiber by 240° around the axis and clockwise with reference to the first unit multicore fiber and fusion-splicing the third unit multicore fiber to the second unit multicore fiber; reversing the fourth unit multicore fiber in the longitudinal direction, rotating the fourth unit multicore fiber by 120° with reference to the first unit multicore fiber, and fusion-splicing the fourth unit multicore fiber to the third unit multicore fiber; rotating the fifth unit multicore fiber by 120° with reference to the first unit multicore fiber, and fusion-splicing the fifth unit multicore fiber to the fourth unit multicore fiber; and reversing the sixth unit multicore fiber in the longitudinal direction, rotating the sixth unit multicore fiber by 240° with reference to the first unit multicore fiber, and fusion-splicing the sixth unit multicore fiber to the fifth unit multicore fiber. In the multicore fiber, the core portions of the first to sixth unit multicore fibers are connected, for example, like Core 1→Core 6 (reversed)→Core 5→Core 4 (reversed)→Core 3→Core 2 (reversed). In this manner, in the case of connecting the unit multicore fibers, reversing in the longitudinal direction as well as rotating around the axis may be performed. Therefore, a combination of connection of the core portions which may not be implemented by only the rotating around the axis may be implemented. Next, the group delay of the manufactured multicore fiber is measured.

Figure 10:
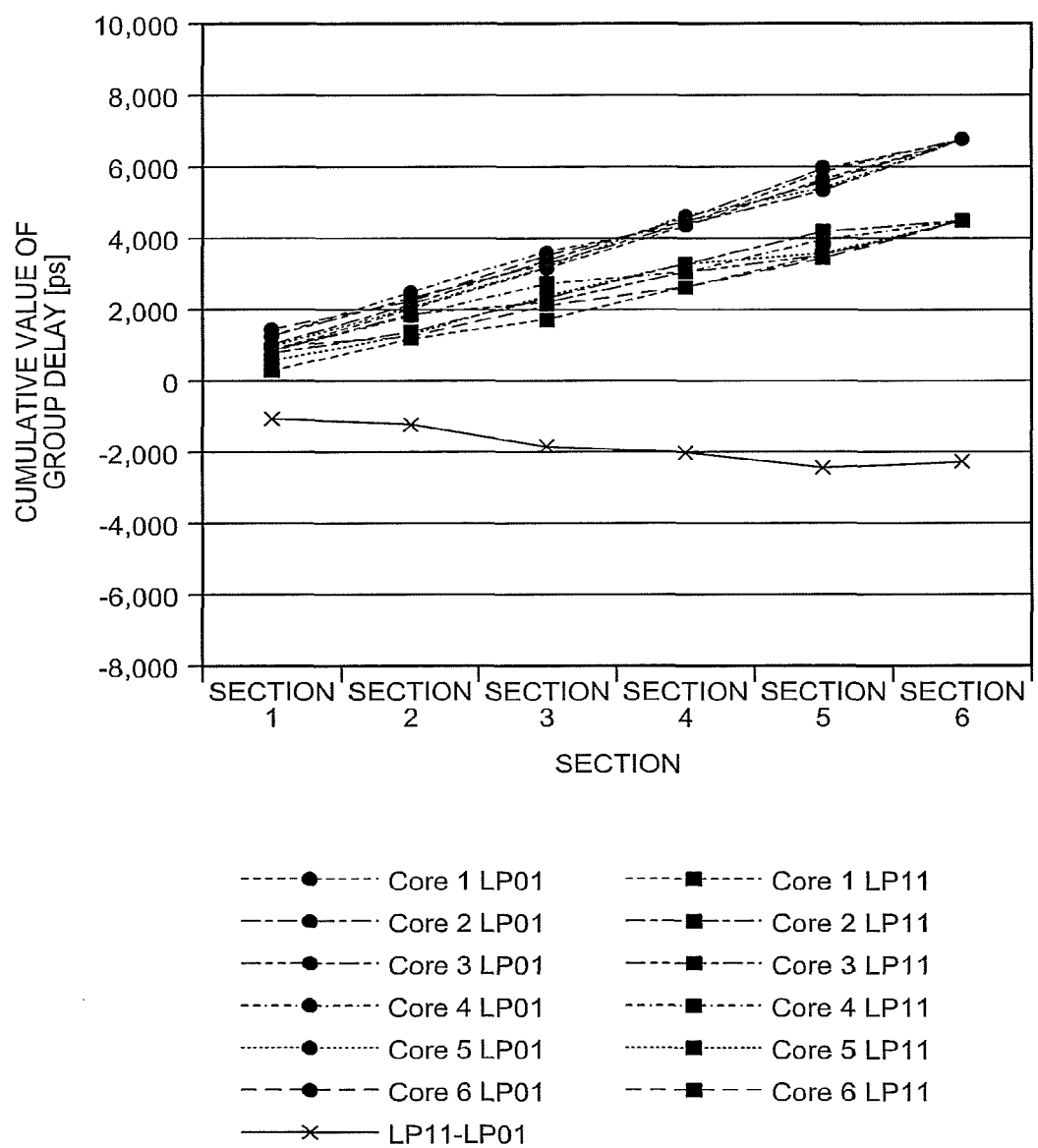
FIG. 10 is a diagram illustrating a cumulative group delay in a multicore fiber according to Example 3.

FIG. 10 is a diagram illustrating a cumulative group delay in a multicore fiber according to Example 3. The wavelength is 1550 nm. As illustrated in FIG. 10, in the multicore fiber of Example 3, the absolute value of the cumulative value of the DMD between the LP11 and LP01 modes becomes 2500 ps (2.5 ns) or less, and thus, the value is greatly decreased in comparison with Comparative Example.

Next, as Example 4, a multicore fiber configured so that the unit multicore fibers are connected in cascade is manufactured by cutting an original multicore fiber by 2 km to manufacture three unit multicore fibers and by reversing the second unit multicore fiber in the longitudinal direction and fusion-splicing the second unit multicore fiber to the first unit multicore fiber; and rotating the third unit multicore fiber by 240° around the axis and clockwise with reference to the first unit multicore fiber and fusion-splicing the third unit multicore fiber to the second unit multicore fiber. In the multicore fiber, the core portions of the first to third unit multicore fibers are connected, for example, like Core 1→Core 6 (reversed)→Core 5. Next, the group delay of the manufactured multicore fiber is measured.

Figure 11:
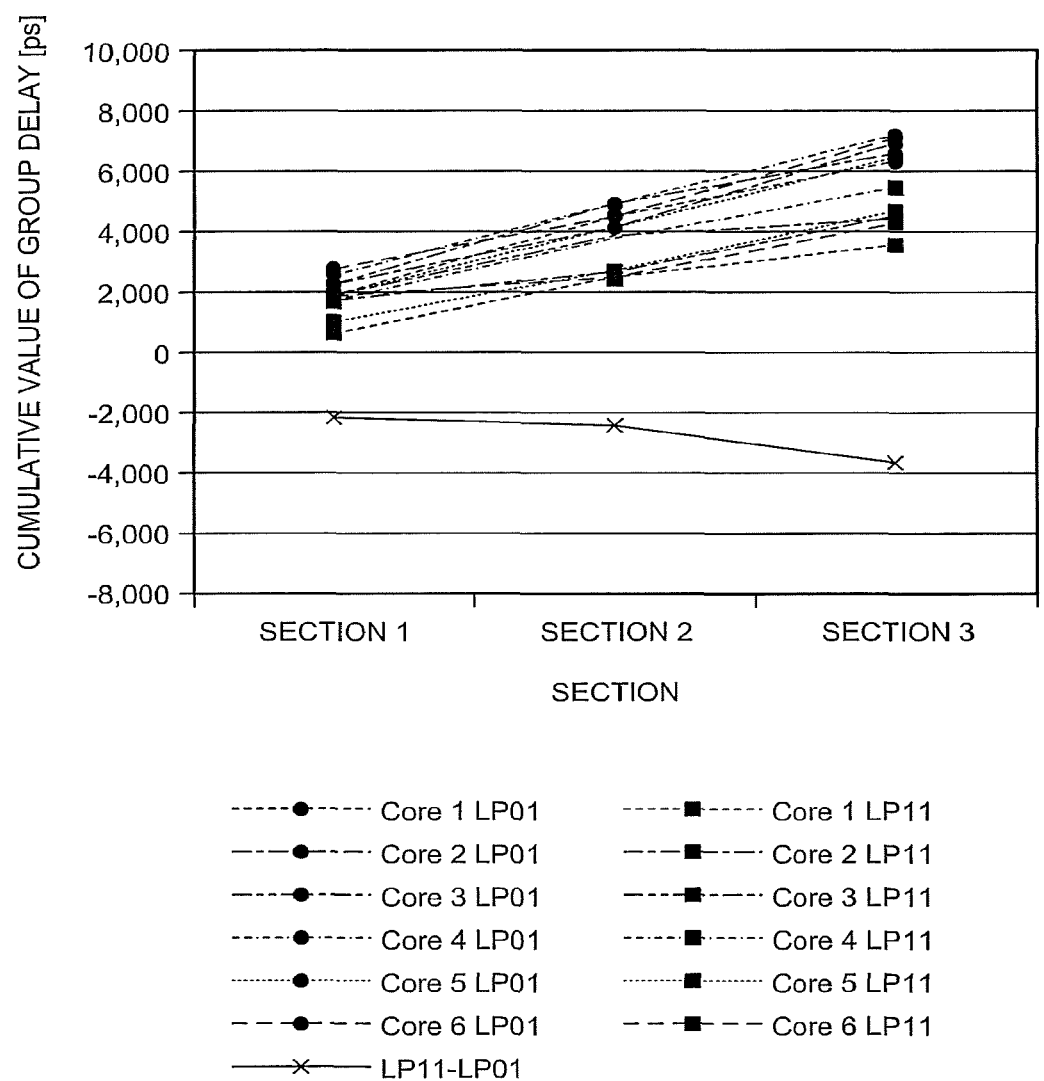
FIG. 11 is a diagram illustrating a cumulative group delay in a multicore fiber according to Example 4.

FIG. 11 is a diagram illustrating a cumulative group delay in a multicore fiber according to Example 4. The wavelength is 1550 nm. As illustrated in FIG. 11, in the multicore fiber of Example 4, the absolute value of the cumulative value of the DMD between the LP11 and LP01 modes becomes 4000 ps (4 ns) or less, and thus, the value is greatly decreased in comparison with Comparative Example.

Next, as Example 5, a multicore fiber configured so that the unit multicore fibers are connected in cascade is manufactured by cutting an original multicore fiber by 3 km to manufacture two unit multicore fibers and by rotating the second unit multicore fiber by 60° around the axis and clockwise and fusion-splicing the second unit multicore fiber to the first unit multicore fiber. In the multicore fiber, the core portions of the first to second unit multicore fibers are connected, for example, like Core 1→Core 2. Next, the group delay of the manufactured multicore fiber is measured.

Figure 12:
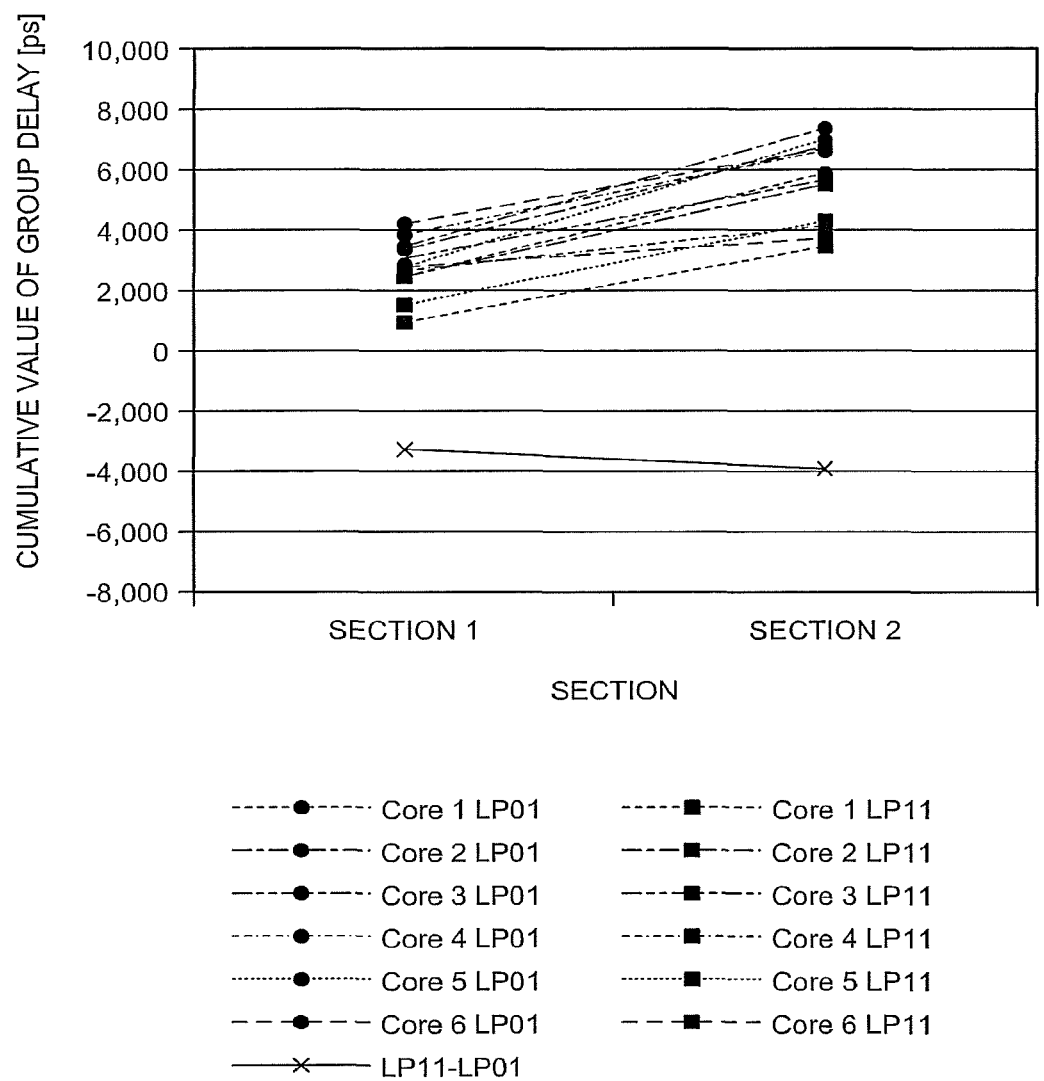
FIG. 12 is a diagram illustrating a cumulative group delay in a multicore fiber according to Example 5.

FIG. 12 is a diagram illustrating a cumulative group delay in a multicore fiber according to Example 5. The wavelength is 1550 nm. As illustrated in FIG. 12, in the multicore fiber of Example 5, the absolute value of the cumulative value of the DMD between the LP11 and LP01 modes becomes 4000 ps (4 ns) or less, and thus, the value is greatly decreased in comparison with Comparative Example.

Next, as Example 6, a multicore fiber configured so that the unit multicore fibers are connected in cascade is manufactured by cutting an original multicore fiber by 3 km to manufacture two unit multicore fibers and by reversing the second unit multicore fiber in the longitudinal direction and fusion-splicing the second unit multicore fiber to the first unit multicore fiber. In the multicore fiber, the core portions of the first to second unit multicore fibers are connected, for example, like Core 1→Core 6 (reversed). Next, the group delay of the manufactured multicore fiber is measured.

Figure 13:
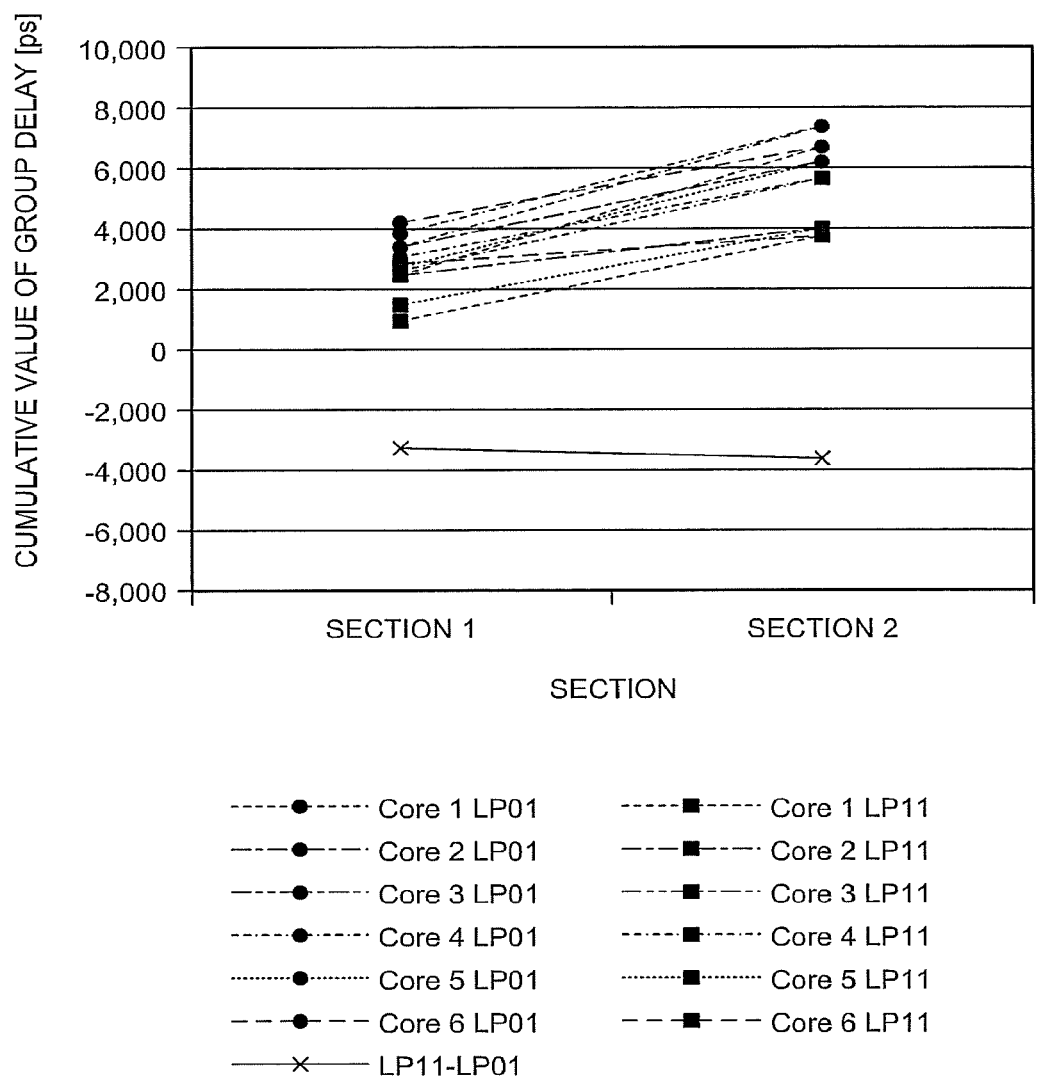
FIG. 13 is a diagram illustrating a cumulative group delay in a multicore fiber according to Example 6.

FIG. 13 is a diagram illustrating a cumulative group delay in a multicore fiber according to Example 6. The wavelength is 1550 nm. As illustrated in FIG. 13, in the multicore fiber of Example 6, the absolute value of the cumulative value of the DMD between the LP11 and LP01 modes becomes 4000 ps (4 ns) or less, and thus, the value is greatly decreased in comparison with Comparative Example.

As illustrated in the above-described Examples, even if the connection after the rotating or reversing is performed on at least one site, the examples are more effective than Comparative Example. However, it is preferable that the connection after the rotating or reversing is performed on two or more sites. In addition, like Examples 1 to 3, it is preferable that the core portions of the multicore fiber are configured to include all the core portions of Core 1 to Core 6 because the cumulative value of the DMD is further reduced.

In the multicore fiber 10 according to the first embodiment, the six core portions are arranged at positions in an equal distance from the central axis of the clad portion at an equal angle to form a circle centered on the central axis. However, the number and arrangement of core portions are not limited thereto. In addition, after cutting the original multicore fiber into a plurality of the unit multicore fibers, it is not necessary to rotate or reverse all the unit multicore fibers to connect the unit multicore fibers. Namely, after the cutting, only the unit multicore fibers which are to be rotated or reversed or had better be rotated or reversed in order to achieve a desired differential group delay are rotated or reversed and, after that, these are connected, so that the unit multicore fibers which may not be particularly rotated or reversed may be connected without rotating or reversing. For example, in Example 4, the multicore fiber is manufactured by the cutting the original multicore fiber by 2 km to manufacture three unit multicore fibers and by rotating or reversing and connecting these unit multicore fibers.

However, the multicore fiber is substantially equivalent to a multicore fiber manufactured by cutting the original multicore fiber by 1 km to manufacture the six unit multicore fibers, connecting two-consecutive unit multicore fibers without rotating or reversing to manufacture three unit multicore fibers, and rotating or reversing these unit multicore fibers like Example 4.

In addition, from the point of view of practical convenience, it is allowable that all the unit multicore fibers are not necessarily rotated or reversed to be connected. For example, a configuration where, after cutting the original multicore fiber into a plurality of the unit multicore fibers, the two end unit multicore fibers are not relatively rotated or reversed to be connected is preferred from the point of view of practical convenience. The configuration where the two end unit multicore fibers are not relatively rotated or reversed to be connected is a configuration where a plurality of the unit multicore fibers are connected like Core 1 of one-end unit multicore fiber→{rotated or reversed core}→Core 1 of multi-end multicore fiber. In such a configuration, for example, the relationship between the ID numbers (Core 1 to Core 6) of the core portions and the channels (ch) of the signal light allocated to the core portions is maintained at two ends (incident side and emitting side) so that the signal light incident on Core 1 is emitted from Core 1 of the other end. Specifically, if the signal light of the ch 1 is incident from Core 1 of one end, the signal light of the ch 1 is emitted from Core 1 of the other end. Therefore, in the configuration where the two end unit multicore fibers are not relatively rotated or reversed to be connected, there is an advantage in that there is little confusion in a user, and the unit multicore fibers other than the two end unit multicore fibers are rotated or reversed to be connected, so that the effect in that the cumulative value of the DMD may be decreased is maintained. In addition, the configuration where the two end unit multicore fibers are not relatively rotated or reversed to be connected may be implemented, for example, by connecting the unit multicore fiber 16 to the unit multicore fiber 15 without rotating and reversing the unit multicore fibers with reference to the unit multicore fiber 11 in the multicore fiber 10 illustrated in FIG. 2B. In addition, by performing similar modification on the configurations of the other Examples 2 to 4 as well as the configuration of Example 1, it is possible to easily implement the configuration where the two end unit multicore fibers are not relatively rotated or reversed to be connected.

Second Embodiment

Figure 14:
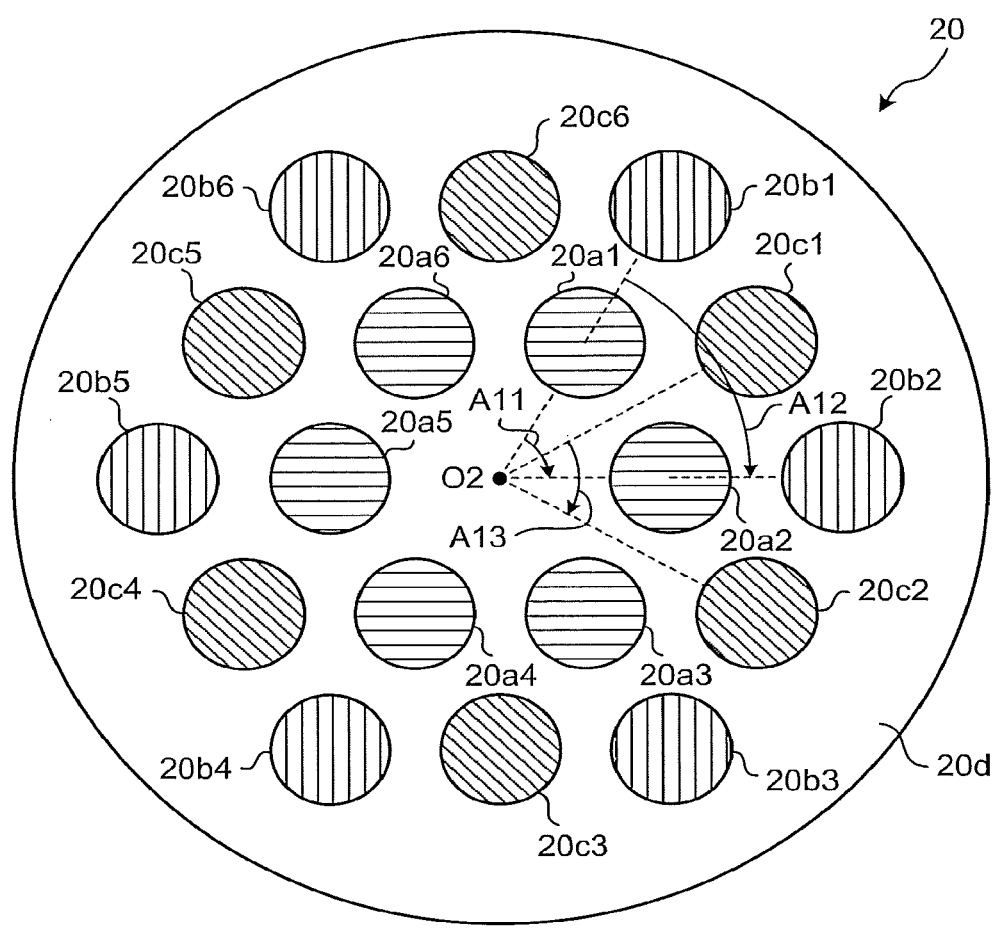
FIG. 14 is a diagram illustrating a configuration of a multicore fiber according to a second embodiment.

FIG. 14 is a diagram illustrating a configuration of a multicore fiber according to a second embodiment. As illustrated in FIG. 14, a multicore fiber 20 according to the second embodiment is configured to include eighteen core portions and a clad portion 20$d$ which is formed in the outer circumference of the core portions and has a refractive index lower than the maximum refractive index of the core portions. The core portions are arranged so as to form a triangular lattice. In addition, the six core portions 20$a$1, 20$a$2, 20$a$3, 20$a$4, 20$a$5, and 20$a$6 are arranged so as to form a regular hexagon centered on a central axis O2 of the clad portion 20$d$. In addition, the twelve core portions 20$b$1, 20$b$2, 20$b$3, 20$b$4, 20$b$5, 20$b$6, 20$c$1, 20$c$2, 20$c$3, 20$c$4, 20$c$5, and 20$c$6 are formed so as to form a concentric regular hexagon centered at the central axis O2 and larger than the regular hexagon formed by the six core portions 20$a$1 to 20$a$6. In addition, the configurations and materials of the core portions may be the same as those of the core portions 10$a$ to 10$f$ of the multicore fiber 10 according to the first embodiment.

The multicore fiber 20 is configured so that a plurality of unit multicore fibers are connected in cascade. The unit multicore fibers are manufactured by cutting an original multicore fiber which is manufactured with lines being continuously drawn and has a length substantially the same as or larger than that of the multicore fiber 20 by equal length and have configurations similar to that of the multicore fiber 20. The multicore fiber 20 is configured by rotating the unit multicore fibers which are manufactured by cutting the original multicore fiber by 60° around the axis and fusion-splicing these unit multicore fibers.

Herein, all the core portions of each of the unit multicore fibers have substantially the same refractive index profile and substantially the same optical characteristics, but since these are not completely the same, the core portions of the same unit multicore fiber have different group delays at the same wavelength in the same propagation mode. In addition, the differential group delay between the different propagation modes at the same wavelength is also different among the core portions.

On the contrary, the multicore fiber 20 according to the second embodiment is configured in the above-described connection, so that the differential group delay between the core portions becomes smaller than the value of a case where signal light propagates the unit multicore fiber by length corresponding to the multicore fiber 20. As a result, the maximum value of the differential group delay between the core portions is smaller than a reduced value of the maximum value of the differential group delay between the core portions of each of the unit multicore fibers as the value in terms of the length of the multicore fiber 20.

In addition, as illustrated in FIG. 14, for example, in a case where the core portion 20$a$1 is rotated by 60° around the central axis O2 to be placed at the position of the core portion 20$a$2 like the arrow A11, accordingly, the core portion 20$b$1 is rotated by 60° around the central axis O2 to be placed at the position of the core portion 20$b$2 like the arrow A12, and the core portion 20$c$1 is rotated by 60° around the central axis O2 to be placed at the position of the core portion 20$c$2 like the arrow A13. Namely, in the arrangement of the core portions of the multicore fiber 20, the core portions are configured as three groups of a group configured by the core portions 20$a$1 to 20$a$6, a group configured by the core portions 20$b$1 to 20$b$6, and a group configured by the core portions 20$c$1 to 20$c$6. In each unit multicore fiber, the core portions are configured as three groups of a group configured by the core portions existing at the positions corresponding to the core portions 20$a$1 to 20$a$6, a group configured by the core portions existing at the positions corresponding to the core portions 20$b$1 to 20$b$6, and a group configured by the core portions existing at the positions corresponding to the core portions 20$c$1 to 20$c$6. Since the core portions in each group of the unit multicore fiber may be connected to each other through the rotation by 60°, the maximum value of the differential group delay between the core portions of the multicore fiber 20 may be decreased by connection of the core portions in the three groups between the unit multicore fibers.

Third Embodiment

Figure 15:
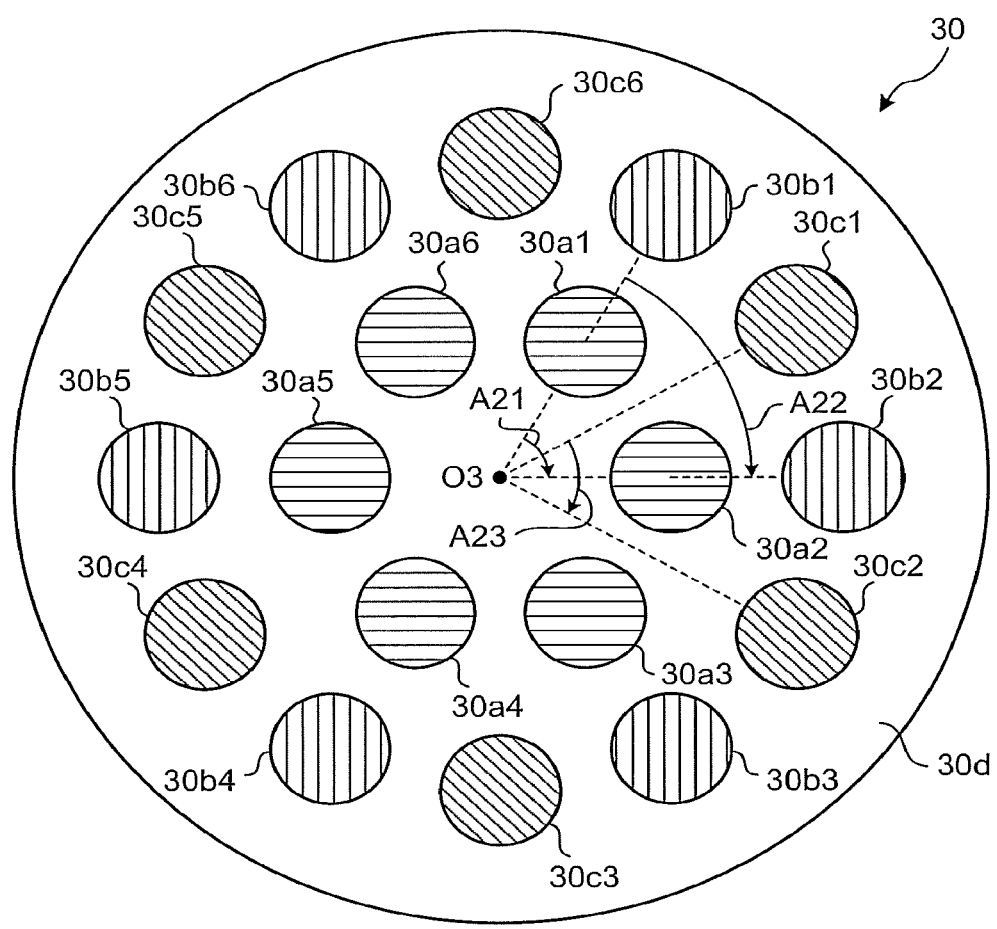
FIG. 15 is a diagram illustrating a configuration of a multicore fiber according to a third embodiment.

FIG. 15 is a diagram illustrating a configuration of a multicore fiber according to a third embodiment. As illustrated in FIG. 15, a multicore fiber 30 according to the third embodiment is configured to include eighteen core portions and a clad portion 30$d$ which is formed in the outer circumference of the core portions and has a refractive index lower than the maximum refractive index of the core portions. Among the core portions, the six core portions 30$a$1, 30$a$2, 30$a$3, 30$a$4, 30$a$5, and 30$a$6 are arranged at positions in an equal distance from the central axis O3 of the clad portion 30$d$ at an equal angle to form a circle centered on the central axis O3. In addition, among the core portions, the twelve core portions 30$b$1, 30$b$2, 30$b$3, 30$b$4, 30$b$5, 30$b$6, 30$c$1, 30$c$2, 30$c$3, 30$c$4, 30$c$5, and 30$c$6 are arranged at positions in an equal distance from the central axis O3 at an equal angle to form a concentric circle which is centered on the central axis O3 and of which radius is larger than that of the circle configured by the six core portions 30$a$1 to 30$a$6. In addition, the configurations and materials of the core portions may be the same as those of the core portions 10$a$ to 10$f$ of the multicore fiber 10 according to the first embodiment.

The multicore fiber 30 is configured so that a plurality of unit multicore fibers are connected in cascade. The unit multicore fibers are manufactured by cutting an original multicore fiber which is manufactured with lines being continuously drawn and has a length substantially the same as or larger than that of the multicore fiber 30 by equal length and have configurations similar to that of the multicore fiber 30. The multicore fiber 30 is configured by rotating the unit multicore fibers which are manufactured by cutting the original multicore fiber by 60° around the axis and fusion-splicing these unit multicore fibers.

Herein, all the core portions of each of the unit multicore fibers have substantially the same refractive index profile and substantially the same optical characteristics, but since these are not completely the same, the core portions of the same unit multicore fiber have different group delays at the same wavelength in the same propagation mode. In addition, the differential group delay between the different propagation modes at the same wavelength is also different among the core portions.

On the contrary, the multicore fiber 30 according to the third embodiment is configured in the above-described connection, so that the differential group delay between the core portions becomes smaller than the value of a case where signal light propagates the unit multicore fiber by length corresponding to the multicore fiber 30. As a result, the maximum value of the differential group delay between the core portions is smaller than a reduced value of the maximum value of the differential group delay between the core portions of each of the unit multicore fibers as the value in terms of the length of the multicore fiber 30.

In addition, as illustrated in FIG. 15, for example, in a case where the core portion 30a1 is rotated by 60° around the central axis O3 to be placed at the position of the core portion 30a2 like the arrow A21, accordingly, the core portion 30b1 is rotated by 60° around the central axis O3 to be placed at the position of the core portion 30b2 like the arrow A22, and the core portion 30c1 is rotated by 60° around the central axis O3 to be placed at the position of the core portion 30c2 like the arrow A23. Namely, in the arrangement of the core portions of the multicore fiber 30, the core portions are configured as three groups of a group configured by the core portions 30a1 to 30a6, a group configured by the core portions 30b1 to 30b6, and a group configured by the core portions 30c1 to 30c6. In each unit multicore fiber, the core portions are configured as three groups of a group configured by the core portions existing at the positions corresponding to the core portions 30a1 to 30a6, a group configured by the core portions existing at the positions corresponding to the core portions 30b1 to 30b6, and a group configured by the core portions existing at the positions corresponding to the core portions 30c1 to 30c6. Since the core portions in each group of the unit multicore fiber may be connected to each other through the rotation by 60°, the maximum value of the differential group delay between the core portions of the multicore fiber 30 may be decreased by connection of the core portions in the three groups between the unit multicore fibers.

Fourth Embodiment

Figure 16:
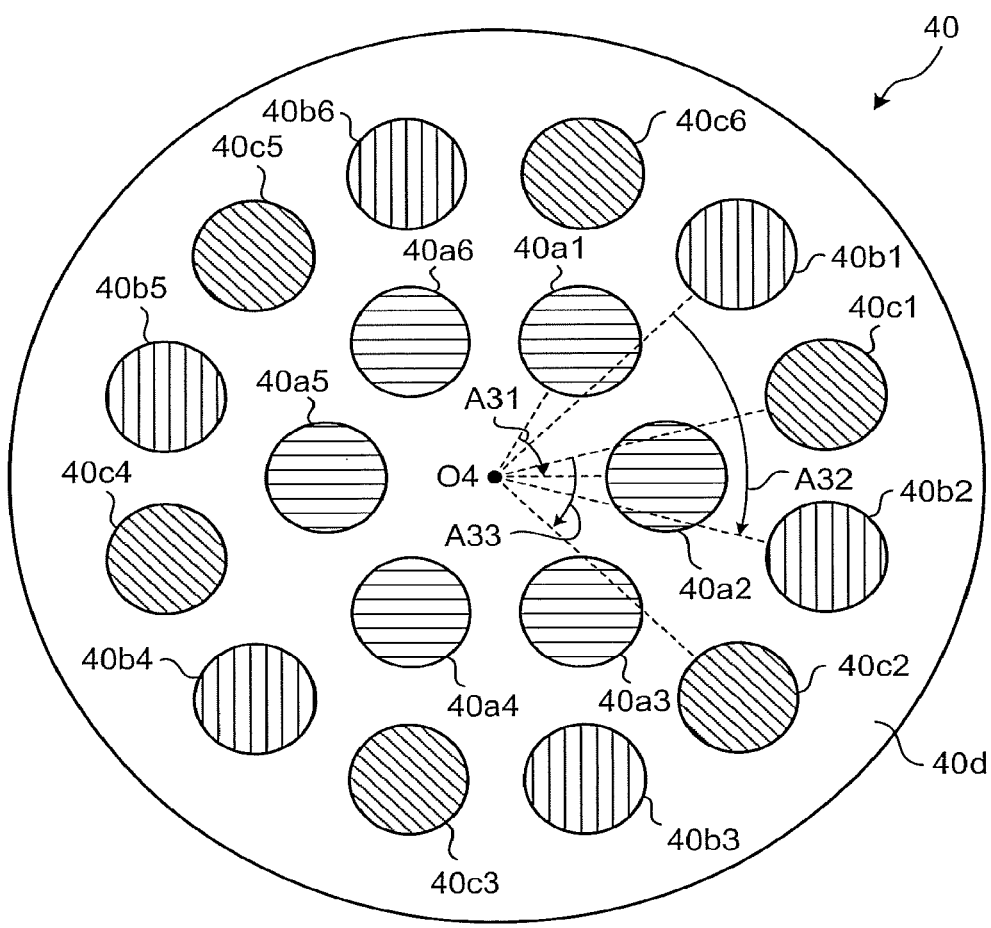
FIG. 16 is a diagram illustrating a configuration of a multicore fiber according to a fourth embodiment.

FIG. 16 is a diagram illustrating a configuration of a multicore fiber according to a fourth embodiment. As illustrated in FIG. 16, a multicore fiber 40 according to the fourth embodiment is configured to include eighteen core portions and a clad portion 40d which is formed in the outer circumference of the core portions and has a refractive index lower than the maximum refractive index of the core portions. Among the core portions, the six core portions 40a1, 40a2, 40a3, 40a4, 40a5, and 40a6 are arranged at positions in an equal distance from the central axis O4 of the clad portion 40d at an equal angle to form a circle centered on the central axis O4. In addition, among the core portions, the twelve core portions 40b1, 40b2, 40b3, 40b4, 40b5, 40b6, 40c1, 40c2, 40c3, 40c4, 40c5, and 40c6 are arranged at positions in an equal distance from the central axis O4 at an equal angle to form a circle which is centered on the central axis O4 and of which radius is larger than that of the circle configured by the six core portions 40a1 to 40a6. In addition, the configurations and materials of the core portions may be the same as those of the core portions 10a to 10f of the multicore fiber 10 according to the first embodiment.

The multicore fiber 40 is configured so that a plurality of unit multicore fibers are connected in cascade. The unit multicore fibers are manufactured by cutting an original multicore fiber which is manufactured with lines being continuously drawn and has a length substantially the same as or larger than that of the multicore fiber 40 by equal length and have configurations similar to that of the multicore fiber 40. The multicore fiber 40 is configured by rotating the unit multicore fibers which are manufactured by cutting the original multicore fiber by 60° around the axis and fusion-splicing these unit multicore fibers.

The multicore fiber 40 and the multicore fiber 30 according to the third embodiment have the same configurations except for the difference in that, in the multicore fiber 30, for example, the core portion 30a1 exists on the line connecting the central axis O3 and the core portion 30b1, but in the multicore fiber 40, for example, the core portion 40a1 exists so as to be shifted from the line connecting the central axis O4 and the core portion 40b1. Therefore, in the multicore fiber 40 according to the fourth embodiment, the maximum value of the differential group delay between the core portions is smaller than a reduced value of the maximum value of the differential group delay between the core portions of each of the unit multicore fibers as the value in terms of the length of the multicore fiber 40.

In addition, as illustrated in FIG. 16, for example, in a case where the core portion 40a1 is rotated by 60° around the central axis O4 to be placed at the position of the core portion 40a2 like the arrow A31, accordingly, the core portion 40b1 is rotated by 60° around the central axis O4 to be placed at the position of the core portion 40b2 like the arrow A32, and the core portion 40c1 is rotated by 60° around the central axis O4 to be placed at the position of the core portion 40c2 like the arrow A33. Namely, in the arrangement of the core portions of the multicore fiber 40, the core portions are configured as three groups of a group configured by the core portions 40a1 to 40a6, a group configured by the core portions 40b1 to 40b6, and a group configured by the core portions 40c1 to 40c6. In each unit multicore fiber, the core portions are configured as three groups of a group configured by the core portions existing at the positions corresponding to the core portions 40a1 to 40a6, a group configured by the core portions existing at the positions corresponding to the core portions 40b1 to 40b6, and a group configured by the core portions existing at the positions corresponding to the core portions 40c1 to 40c6. Since the core portions in each group of the unit multicore fiber may be connected to each other through the rotation by 60°, the maximum value of the differential group delay between the core portions of the multicore fiber 40 may be decreased by connection of the core portions in the three groups between the unit multicore fibers.

Fifth Embodiment

Figure 17:
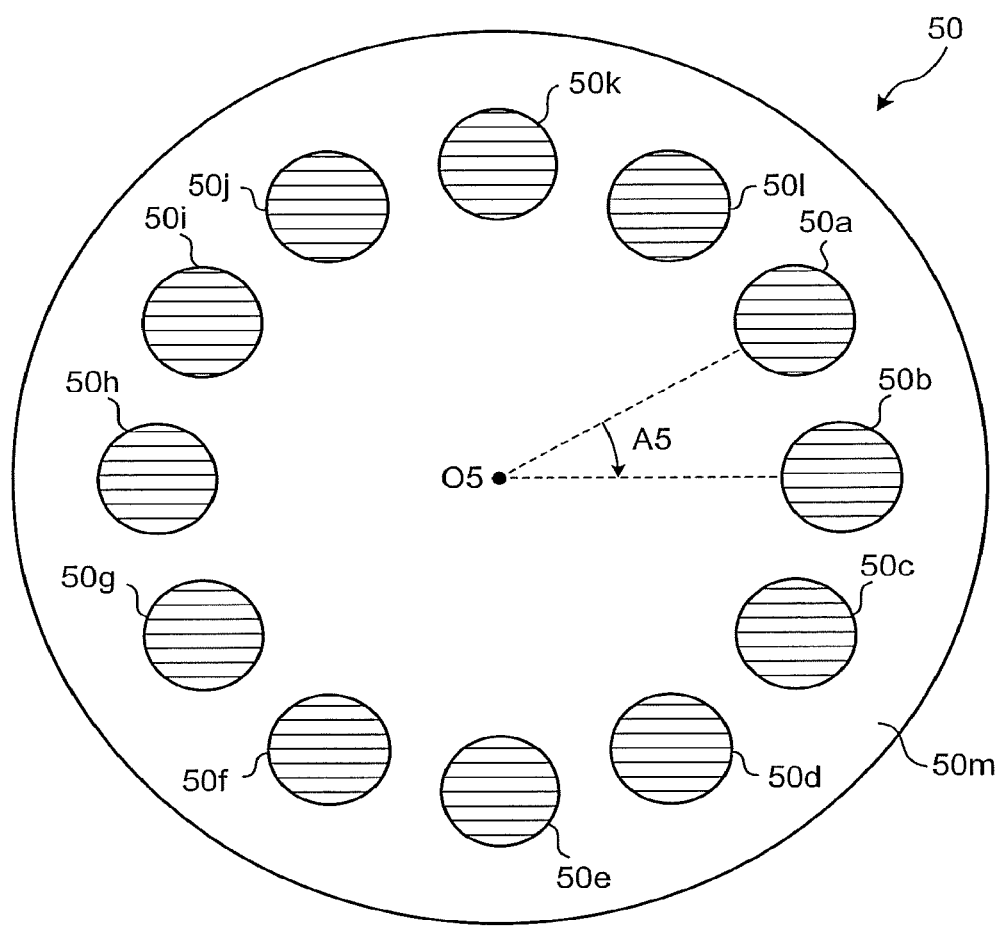
FIG. 17 is a diagram illustrating a configuration of a multicore fiber according to a fifth embodiment.

FIG. 17 is a diagram illustrating a configuration of a multicore fiber according to a fifth embodiment. As illustrated in FIG. 17, a multicore fiber 50 according to the fifth embodiment is configured to include twelve core portions 50a, 50b, 50c, 50d, 50e, 50f, 50g, 50h, 50i, 50j, 50k, and 50l and a clad portion 50m which is formed in the outer circumference of the core portions and has a refractive index lower than the maximum refractive index of the core portions. The core portions 50a to 50l are arranged at positions in an equal distance from the central axis O5 of the clad portion 50m at an equal angle to form a circle centered on the central axis O5. In addition, the configurations and materials of the core portions may be the same as those of the core portions 10a to 10f of the multicore fiber 10 according to the first embodiment.

The multicore fiber 50 is configured so that a plurality of unit multicore fibers are connected in cascade. The unit multicore fibers are manufactured by cutting an original multicore fiber which is manufactured with lines being continuously drawn and has a length substantially the same as or larger than that of the multicore fiber 50 by equal length and have configurations similar to that of the multicore fiber 50. All the core portions of each of the unit multicore fibers have substantially the same refractive index profile and substantially the same optical characteristics, but these are not completely the same. The multicore fiber 50 is configured by rotating the unit multicore fibers which are manufactured by cutting the original multicore fiber by 30° around the axis and fusion-splicing these unit multicore fibers.

The multicore fiber 50 according to the fifth embodiment is configured in the above-described connection, so that the differential group delay between the core portions becomes smaller than the value of a case where signal light propagates the unit multicore fiber by length corresponding to the multicore fiber 50. As a result, the maximum value of the differential group delay between the core portions is smaller than a reduced value of the maximum value of the differential group delay between the core portions of each of the unit multicore fibers as the value in terms of the length of the multicore fiber 50.

In addition, as illustrated in FIG. 17, the core portions 50a to 50l are arranged to have 12-fold rotational symmetry. The core portions of each of the unit multicore fibers are also arranged to have 12-fold rotational symmetry. Therefore, since the core portions of the unit multicore fiber may be connected to each other through the rotation by 30° around the central axis O5 like arrow A5, the maximum value of the differential group delay between the core portions of the multicore fiber 50 may be decreased by connection of the twelve core portions between the unit multicore fibers.

Sixth Embodiment

Figure 18:
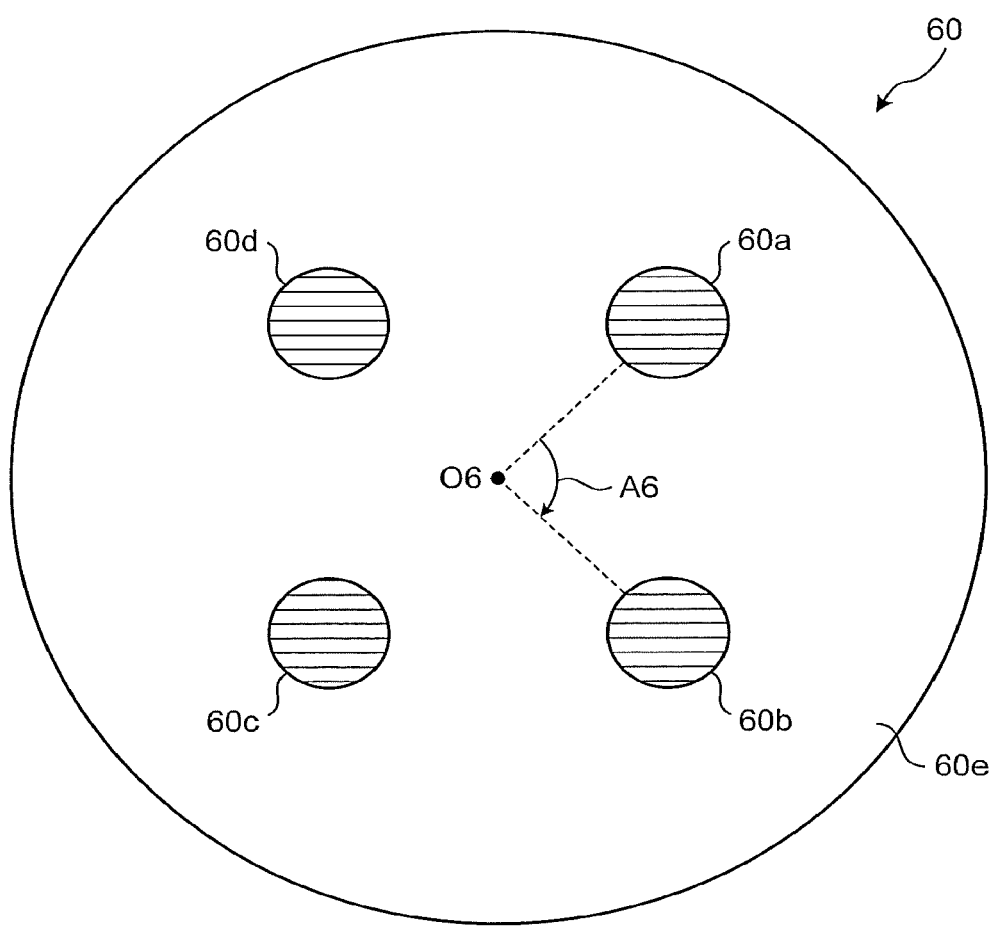
FIG. 18 is a diagram illustrating a configuration of a multicore fiber according to a sixth embodiment.

FIG. 18 is a diagram illustrating a configuration of a multicore fiber according to a sixth embodiment. As illustrated in FIG. 18, a multicore fiber 60 according to the sixth embodiment is configured to include four core portions 60a, 60b, 60c, and 60d and a clad portion 60e which is formed in the outer circumference of the core portions and has a refractive index lower than the maximum refractive index of the core portions. The core portions 60a to 60d are arranged at positions in an equal distance from the central axis O6 of the clad portion 60e at an equal angle to form a circle or a square centered on the central axis O6. In addition, the configurations and materials of the core portions may be the same as those of the core portions 10a to 10f of the multicore fiber 10 according to the first embodiment.

The multicore fiber 60 is configured so that a plurality of unit multicore fibers are connected in cascade. The unit multicore fibers are manufactured by cutting an original multicore fiber which is manufactured with lines being continuously drawn and has a length substantially the same as or larger than that of the multicore fiber 60 by equal length and have configurations similar to that of the multicore fiber 60. All the core portions of each of the unit multicore fibers have substantially the same refractive index profile and substantially the same optical characteristics, but these are not completely the same. The multicore fiber 60 is configured by rotating the unit multicore fibers which are manufactured by cutting the original multicore fiber by 90° around the axis and fusion-splicing these unit multicore fibers.

On the contrary, the multicore fiber 60 according to the sixth embodiment is configured in the above-described connection, so that the differential group delay between the core portions becomes smaller than the value of a case where signal light propagates the unit multicore fiber by length corresponding to the multicore fiber 60. As a result, the maximum value of the differential group delay between the core portions is smaller than a reduced value of the maximum value of the differential group delay between the core portions of each of the unit multicore fibers as the value in terms of the length of the multicore fiber 60.

In addition, as illustrated in FIG. 18, the core portions 60a to 60d are arranged to have 4-fold rotational symmetry. The core portions of each of the unit multicore fibers are also arranged to have 4-fold rotational symmetry. Therefore, since the core portions of the unit multicore fiber may be connected to each other through the rotation by 90° around the central axis O6 like arrow A6, the maximum value of the differential group delay between the core portions of the multicore fiber 60 may be decreased by connection of the four core portions between the unit multicore fibers.

Seventh Embodiment

Figure 19:
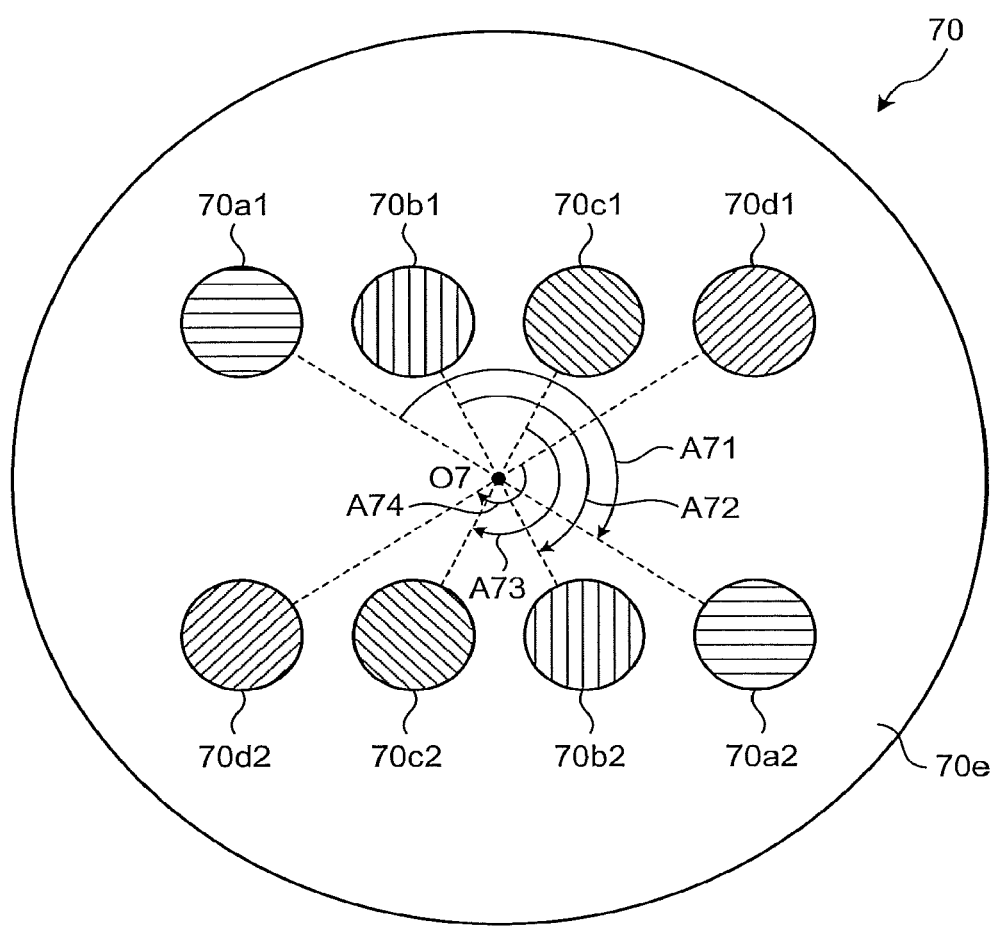
FIG. 19 is a diagram illustrating a configuration of a multicore fiber according to a seventh embodiment.

FIG. 19 is a diagram illustrating a configuration of a multicore fiber according to a seventh embodiment. As illustrated in FIG. 19, a multicore fiber 70 according to the seventh embodiment is configured to include eight core portions and a clad portion 70e which is formed in the outer circumference of the core portions and has a refractive index lower than the maximum refractive index of the core portions. Among the core portions, the core portions 70a1 and 70a2 are arranged at positions in an equal distance from the central axis O7 of the clad portion 70e to interpose the central axis O7. Similarly, the core portions 70b1 and 70b2, the core portions 70c1 and 70c2, and the core portions 70d1 and 70d2 are arranged at positions in respective equal distance from the central axis O7 of the clad portion 70e to interpose the central axis O7. In addition, the core portion 70a1, 70b1, 70c1, and 70d1, and the respective core portions 70a2, 70b2, 70c2, and 70d2 are arranged in respective shapes of straight lines interposing the central axis O7. In addition, the configurations and materials of the core portions may be the same as those of the core portions 10a to 10f of the multicore fiber 10 according to the first embodiment.

The multicore fiber 70 is configured so that a plurality of unit multicore fibers are connected in cascade. The unit multicore fibers are manufactured by cutting an original multicore fiber which is manufactured with lines being continuously drawn and has a length substantially the same as or larger than that of the multicore fiber 70 by equal length and have configurations similar to that of the multicore fiber 70. All the core portions of each of the unit multicore fibers have substantially the same refractive index profile and substantially the same optical characteristics, but these are not completely the same. The multicore fiber 70 is configured by rotating the unit multicore fibers which are manufactured by cutting the original multicore fiber by 180° around the axis and fusion-splicing these unit multicore fibers.

The multicore fiber 70 according to the seventh embodiment is configured in the above-described connection, so that the differential group delay between the core portions becomes smaller than the value of a case where signal light propagates the unit multicore fiber by length corresponding to the multicore fiber 70. As a result, the maximum value of the differential group delay between the core portions is smaller than a reduced value of the maximum value of the differential group delay between the core portions of each of the unit multicore fibers as the value in terms of the length of the multicore fiber 70.

In addition, as illustrated in FIG. 19, for example, in a case where the core portion 70a1 is rotated by 180° around the central axis O7 to be placed at the position of the core portion 70a2 like the arrow A71, accordingly, the core portion 70b1 is rotated by 180° around the central axis O7 to be placed at the position of the core portion 70b2 like the arrow A72, the core portion 70c1 is rotated by 180° around the central axis O7 to be placed at the position of the core portion 70c2 like the arrow A73, and the core portion 70d1 is rotated by 180° around the central axis O7 to be placed at the position of the core portion 70d2 like the arrow A74. Namely, in the arrangement of the core portions of the multicore fiber 70, the core portions are configured as four groups of a group configured by the core portions 70a1 and 70a2, a group configured by the core portions 70b1 and 70b2, a group configured by the core portions 70c1 and 70c2, and a group configured by the core portions 70d1 and 70d2. In each unit multicore fiber, the core portions are configured as groups of core portions corresponding to the respective groups. Since the core portions in each group of the unit multicore fiber may be connected to each other through the rotation by 180°, the maximum value of the differential group delay between the core portions of the multicore fiber 70 may be decreased by connection of the core portions in the four groups between the unit multicore fibers.

Eighth Embodiment

Figure 20:
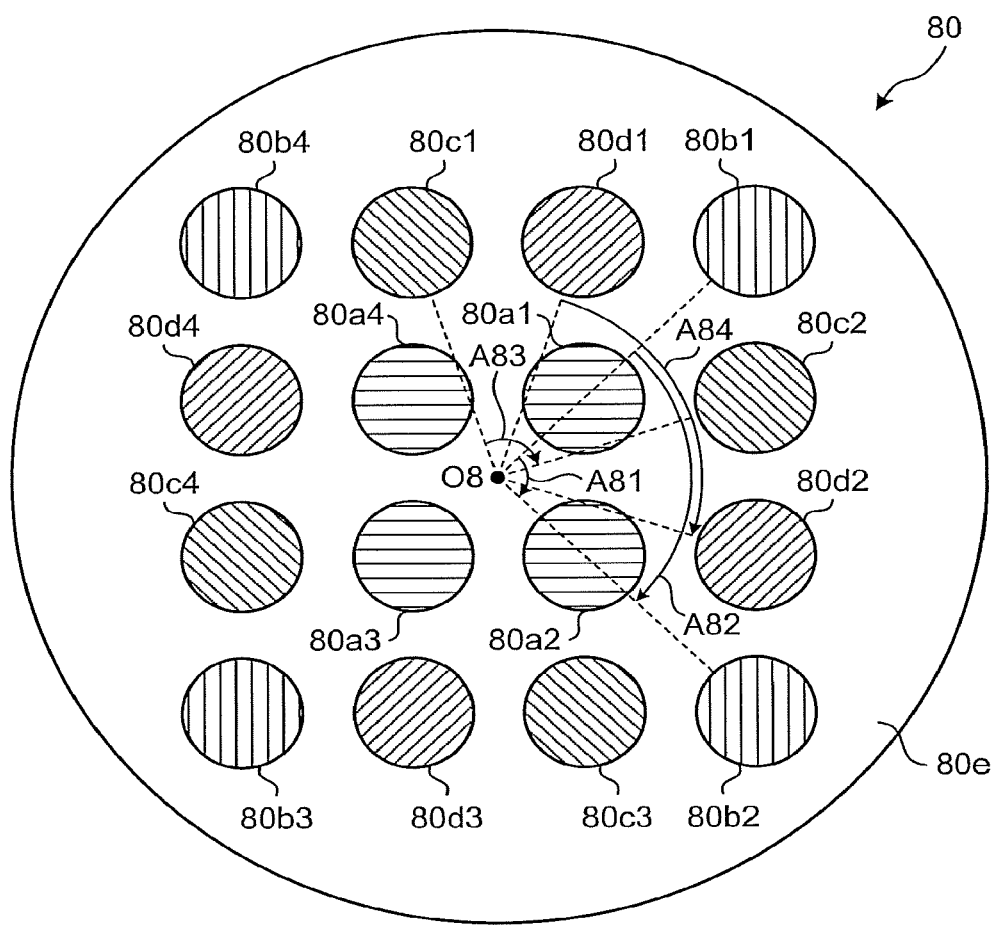
FIG. 20 is a diagram illustrating a configuration of a multicore fiber according to an eighth embodiment.

FIG. 20 is a diagram illustrating a configuration of a multicore fiber according to an eighth embodiment. As illustrated in FIG. 20, a multicore fiber 80 according to the eighth embodiment is configured to include sixteen core portions and a clad portion 80e which is formed in the outer circumference of the core portions and has a refractive index lower than the maximum refractive index of the core portions. The core portions may be arranged so as to be a tetragonal lattice. In addition, the four core portions 80a1, 80a2, 80a3, and 80a4 are arranged to form a square centered on the central axis O8 of the clad portion 80e. In addition, the twelve core portions 80b1, 80b2, 80b3, 80b4, 80c1, 80c2, 80c3, 80c4, 80d1, 80d2, 80d3, and 80d4 are arranged to form a concentric square which is centered on the central axis O8 and is larger than the square configured by the core portions 80a1 to 80a4. In addition, the configurations and materials of the core portions may be the same as those of the core portions 10a to 10f of the multicore fiber 10 according to the first embodiment.

The multicore fiber 80 is configured so that a plurality of unit multicore fibers are connected in cascade. The unit multicore fibers are manufactured by cutting an original multicore fiber which is manufactured with lines being continuously drawn and has a length substantially the same as or larger than that of the multicore fiber 80 by equal length and have configurations similar to that of the multicore fiber 80. All the core portions of each of the unit multicore fibers have substantially the same refractive index profile and substantially the same optical characteristics, but these are not completely the same. The multicore fiber 80 is configured by rotating the unit multicore fibers which are manufactured by cutting the original multicore fiber by 90° around the axis and fusion-splicing these unit multicore fibers.

The multicore fiber 80 according to the eighth embodiment is configured in the above-described connection, so that the differential group delay between the core portions becomes smaller than the value of a case where signal light propagates the unit multicore fiber by length corresponding to the multicore fiber 80. As a result, the maximum value of the differential group delay between the core portions is smaller than a reduced value of the maximum value of the differential group delay between the core portions of each of the unit multicore fibers as the value in terms of the length of the multicore fiber 80.

In addition, as illustrated in FIG. 20, for example, in a case where the core portion 80a1 is rotated by 90° around the central axis O8 to be placed at the position of the core portion 80a2 like the arrow A81, accordingly, the core portion 80b1 is rotated by 90° around the central axis O8 to be placed at the position of the core portion 80b2 like the arrow A82, the core portion 80c1 is rotated by 90° around the central axis O8 to be placed at the position of the core portion 80c2 like the arrow A83, and the core portion 80d1 is rotated by 90° around the central axis O8 to be placed at the position of the core portion 80d2 like the arrow A84. Namely, in the arrangement of the core portions of the multicore fiber 80, the core portions are configured as four groups of a group configured by the core portions 80a1 to 80a4, a group configured by the core portions 80b1 to 80b4, a group configured by the core portions 80c1 to 80c4, and a group configured by the core portions 80d1 to 80d4. In each unit multicore fiber, the core portions are configured as groups of core portions corresponding to the respective groups. Since the core portions in each group of the unit multicore fiber may be connected to each other through the rotation by 90°, the maximum value of the differential group delay between the core portions of the multicore fiber 80 may be decreased by connection of the core portions in the four groups between the unit multicore fibers.

In addition, in the above-described second to eighth embodiments, all the core portions of each of the unit multicore fibers have substantially the same refractive index profiles and substantially the same optical characteristics. However, for example, the core portions of each of the unit multicore fibers may be configured so that the core portions in each group have substantially the same refractive index profiles and substantially the same optical characteristics and the refractive index profiles between the groups are not substantially the same.

In addition, in the above-described embodiments, the unit multicore fibers are manufactured by cutting the original multicore fiber which is manufactured with lines being continuously drawn by equal length. However, the unit multicore fibers may be manufactured by cutting the original multicore fiber which is manufactured with lines being separately drawn, or the unit multicore fibers may be manufactured to have different lengths. In addition, with respect to the connection of the core portions of the unit multicore fiber, it is preferable that, the group delays of the core portions of each unit multicore fiber may be measured in advance, and the connecting is performed through a combination of rotating or reversing of the unit multicore fibers so that the differential group delay between the core portions becomes small on the basis of the measured values.

In addition, in the above-described embodiments, in the multicore fiber, the refractive index profile is set so that two propagation modes of the LP01 mode and the LP11 mode at a wavelength of the input light exist. In the trench-type refractive index profile set so that the two propagation modes of the LP01 mode and the LP11 mode exist at a wavelength in a band of 1.55 μm, the design parameters are not limited to the design parameter of the above-described Example (Δ1: 0.82%, α: 2, Δ2: 0%, Δ3: −0.46%, a1: 7.3 μm, a2: 9.1 μm, a3: 13.4 μm, Λ: 30 μm, and clad diameter: 125 μm). For example, the design parameters may be combined from the ranges where Δ1 is in a range of 0.2% to 1.6%, Δ2 is in the vicinity of 0%, for example, in a range of −0.03% to 0.03%, Δ3 is in a range of −0.2% to −0.7%, a1 is in a range of 4 μm to 12.5 μm, a2 is in a range of 1 to 3 as a ratio to a1 (a2/a1=Ra2), and a3 is in a range of 2 to 4 as a ratio to a1 (a3/a1=Ra3) so that the above-described two propagation modes exist. In addition, α and the core pitch are not particularly limited. In addition, the refractive index profile in a case where there is no region having Δ2 and Ra2 is 1 is referred to as a w-type refractive index profile.

Table 4 is a table listing the design parameters in the above-described ranges in the trench-type refractive index profile and Aeff, neff, group delay, and DMD in the LP01 and LP11 modes at a wavelength of 1550 nm in the case of predetermined α and core pitch. In addition, in Table 4, α is "step" denotes that α is 20 or more and the center core portion is considered to have a step-index-type refractive index profile. In the case of the original multicore fiber having the parameters illustrated in Table 4, like the above-described Examples in a case where the refractive index profiles of the core portions are substantially the same, the differential group delay between the core portions may be decreased by appropriately performing cutting, rotating or reversing, and connecting.

TABLE 4

| Δ[%] | | | | | | 2a1 [μm] | Core Pitch [μm] | Aeff[μm²] | | neff | | Group Delay [ps/km] | | DMD [ps/km] |
|---|---|---|---|---|---|---|---|---|---|---|---|---|---|---|
| Δ1 | Δ2 | Δ3 | α | Ra2 | Ra3 | | | LP01 | LP11 | LP01 | LP11 | LP01 | LP11 | LP11-LP01 |
| 0.21 | 0.01 | −0.52 | 8 | 1.7 | 2.1 | 23.2 | 56 | 264 | 428 | 1.44666 | 1.44562 | 4.89E+06 | 4.89E+06 | 1169 |
| 0.43 | 0.00 | −0.64 | 3 | 2.0 | 2.2 | 17.7 | 41 | 114 | 224 | 1.44852 | 1.44619 | 4.90E+06 | 4.90E+06 | 322 |
| 0.59 | 0.02 | −0.70 | step | 1.4 | 3.2 | 12.6 | 47 | 97 | 142 | 1.45093 | 1.44807 | 4.91E+06 | 4.91E+06 | 5193 |
| 0.67 | 0.00 | −0.40 | 1.7 | 1.5 | 2.3 | 16.8 | 43 | 77 | 174 | 1.45002 | 1.44669 | 4.91E+06 | 4.91E+06 | −1436 |
| 0.78 | −0.01 | −0.42 | 2.1 | 1.2 | 1.8 | 15.1 | 32 | 66 | 133 | 1.45166 | 1.44767 | 4.91E+06 | 4.91E+06 | 354 |
| 0.85 | 0.00 | −0.25 | 3 | 2.2 | 2.7 | 13.4 | 40 | 62 | 118 | 1.45285 | 1.44852 | 4.92E+06 | 4.92E+06 | 1223 |
| 0.99 | −0.02 | −0.57 | step | 1.3 | 2.1 | 9.3 | 25 | 53 | 79 | 1.45511 | 1.44994 | 4.93E+06 | 4.94E+06 | 8991 |
| 1.15 | 0.00 | −0.38 | 2.4 | 1.6 | 2.4 | 12.5 | 32 | 47 | 93 | 1.45563 | 1.44998 | 4.93E+06 | 4.93E+06 | 579 |
| 1.57 | 0.03 | −0.43 | 5 | 2.0 | 2.8 | 8.2 | 26 | 31 | 56 | 1.46016 | 1.45137 | 4.96E+06 | 4.96E+06 | 4355 |

In addition, as the refractive index profile where the above-described two propagation modes exist at a wavelength of the input light, there is a single-peak-type refractive index profile where, in the trench-type refractive index profile, there is no region having Δ2 or Δ3 and Ra2=Ra3=1. In the single-peak-type refractive index profile set so that the above-described two propagation modes exist at a wavelength in a band of 1.55 μm, the design parameters may be combined from the ranges where Δ1 is a range of 0.2% to 1.6% and a1 is in a range of 3.5 μm to 10.0 μm so that the above-described two propagation modes exist. In addition, α and the core pitch are not particularly limited.

Table 5 is a table listing the design parameters in the above-described ranges in the single-peak-type refractive index profile and Aeff, neff, group delay, and DMD in the LP01 and LP11 modes at a wavelength of 1550 nm in the case of predetermined α and core pitch. In the case of the original multicore fiber having the parameters illustrated in Table 5, like the above-described Examples in a case where the refractive index profiles of the core portions are substantially the same, the differential group delay between the core portions may be decreased by appropriately performing cutting, rotating or reversing, and connecting.

TABLE 5

| Δ1 [%] | α | 2a1 [μm] | Core Pitch [μm] | Aeff[μm²] | | neff | | Group Delay [ps/km] | | DMD[ps/km] |
|---|---|---|---|---|---|---|---|---|---|---|
| | | | | LP01 | LP11 | LP01 | LP11 | LP01 | LP11 | LP11-LP01 |
| 0.28 | 10 | 17.8 | 58 | 172 | 296 | 1.44727 | 1.44568 | 4.89E+06 | 4.89E+06 | 1292 |
| 0.34 | step | 15.6 | 43 | 156 | 249 | 1.44805 | 1.44628 | 4.90E+06 | 4.90E+06 | 2218 |
| 0.58 | 3 | 12.3 | 49 | 68 | 176 | 1.44922 | 1.44543 | 4.91E+06 | 4.90E+06 | −3365 |

TABLE 5-continued

| $\Delta 1$ | | Core Pitch | Aeff[μm²] | | neff | | Group Delay [ps/km] | | DMD[ps/km] |
|---|---|---|---|---|---|---|---|---|---|
| [%] | α | [μm] | [μm] | LP01 | LP11 | LP01 | LP11 | LP01 | LP11 | LP11-LP01 |
| 0.86 | 9 | 10.2 | 35 | 55 | 96 | 1.45319 | 1.44828 | 4.92E+06 | 4.93E+06 | 3780 |
| 1.07 | 2 | 11.5 | 32 | 43 | 100 | 1.45355 | 1.44756 | 4.93E+06 | 4.92E+06 | −3323 |
| 1.25 | step | 7.4 | 37 | 37 | 63 | 1.45719 | 1.44987 | 4.94E+06 | 4.95E+06 | 6569 |
| 1.43 | 2.7 | 9.9 | 28 | 34 | 69 | 1.45793 | 1.45018 | 4.95E+06 | 4.95E+06 | 69 |

In addition, in the above-described embodiments, although the refractive index profile of the multicore fiber is set so that the above-described two propagation modes exist, the number of propagation modes is not particularly limited, and a larger number of propagation modes may be used. In addition, the present disclosure may be applied to, for example, a single-mode multicore fiber having core portions of which refractive index profile is set so that a single propagation mode exists at a wavelength of input light. In this case, the differential group delay is a differential group delay between the core portions in the single propagation mode. For example, in the case of a single-mode multicore fiber, in a case where crosstalk may easily occur due to a small core pitch, when the crosstalk is compensated for in a MIMO process, the multicore fiber according to the present disclosure is applied, so that it is possible to reduce load of the MIMO process.

In the trench-type refractive index profile set so that a single propagation mode exists at a wavelength in a band of 1.55 μm, the design parameters may be combined from the ranges where $\Delta 1$ is in a range of 0.2% to 1.2%, $\Delta 2$ is in the vicinity of 0%, for example, in a range of −0.05% to 0.05%, $\Delta 3$ is in a range of −0.2% to −0.7%, a1 is in a range of 2.5 μm to 7.0 μm, a2 is in a range of 1 to 3 as a ratio to a1 (a2/a1=Ra2), and a3 is in a range of 2 to 5 as a ratio to a1 (a3/a1=Ra3) so that the single propagation mode exists. In addition, α and the core pitch are not particularly limited. In addition, the refractive index profile in a case where there is no region having $\Delta 2$ and Ra2 is 1 is referred to as a w-type refractive index profile.

Table 6 is a table listing the design parameters in the above-described ranges in the trench-type refractive index profile and Aeff and group delay at a wavelength of 1550 nm and cut-off wavelength in the case of predetermined α and core pitch. In the case of the original multicore fiber having the parameters illustrated in Table 6, like the above-described Examples in a case where the refractive index profiles of the core portions are substantially the same, the differential group delay between the core portions may be decreased by appropriately performing cutting, rotating or reversing, and connecting.

In the single-peak-type refractive index profile set so that a single propagation mode exists at a wavelength in a band of 1.55 μm, the design parameters may be combined from the ranges where $\Delta 1$ is in a range of 0.2% to 1.5% and a1 is in a range of 1.5 μm to 6.0 μm so that the single propagation mode exists. In addition, α and the core pitch are not particularly limited.

Table 7 is a table listing the design parameters in the above-described ranges in the single-peak-type refractive index profile and Aeff and group delay at a wavelength of 1550 nm and cut-off wavelength in the case of predetermined α and core pitch. In the case of the original multicore fiber having the parameters illustrated in Table 7, like the above-described Examples in a case where the refractive index profiles of the core portions are substantially the same, the differential group delay between the core portions may be decreased by appropriately performing cutting, rotating or reversing, and connecting.

TABLE 7

| $\Delta 1$ [%] | α | 2a1 [μm] | Core Pitch [μm] | Aeff [μm²] | Cut-Off Wavelength [nm] | Group Delay [ps/km] |
|---|---|---|---|---|---|---|
| 0.24 | step | 11.7 | 65 | 130 | 1530 | 4.89E+06 |
| 0.35 | step | 8.2 | 56 | 79 | 1310 | 4.90E+06 |
| 0.50 | 9 | 6.4 | 42 | 54 | 1080 | 4.90E+06 |
| 0.71 | step | 5.8 | 30 | 40 | 1170 | 4.91E+06 |
| 1.03 | 12 | 3.1 | 25 | 38 | 770 | 4.91E+06 |

The present disclosure is not limited to the above-described embodiments. An appropriate combinational configuration of the components described above is also included in the present disclosure. In addition, new effects and modified examples may be easily derived from the ordinarily skilled in the art. Therefore, aspects wider than those of the present disclosure are not limited to the above-described embodiments, but various changes are available.

As described heretofore, a multicore fiber and a method of manufacturing the multicore fiber according to the present disclosure are useful for information transmission to which SDM systems are applied.

TABLE 6

| $\Delta$[%] | | | α | Ra2 | Ra3 | 2a1 [μm] | Core Pitch [μm] | Aeff [μm2] | Cut-Off Wavelength [nm] | Group Delay [ps/km] |
|---|---|---|---|---|---|---|---|---|---|---|
| $\Delta 1$ | $\Delta 2$ | $\Delta 3$ | | | | | | | | |
| 0.20 | 0.02 | −0.61 | step | 2.1 | 3.8 | 13.2 | 57 | 161 | 1520 | 4.89E+06 |
| 0.31 | 0.00 | −0.70 | 10 | 2.0 | 3.0 | 9.6 | 35 | 84 | 1210 | 4.90E+06 |
| 0.34 | 0.05 | −0.68 | step | 1.8 | 2.6 | 10.1 | 42 | 93 | 1500 | 4.90E+06 |
| 0.58 | −0.03 | −0.45 | 5 | 2.7 | 4.5 | 7.7 | 43 | 48 | 1220 | 4.91E+06 |
| 0.72 | −0.01 | −0.53 | 3 | 1.2 | 2.4 | 6.3 | 39 | 30 | 1120 | 4.91E+06 |
| 1.12 | 0.00 | −0.27 | step | 2.3 | 3.7 | 5.9 | 33 | 30 | 1530 | 4.94E+06 |

According to the present disclosure, it is possible to obtain an effect that a multicore fiber and a method of manufacturing the multicore fiber where a differential group delay between core portions is reduced may be implemented.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multicore fiber comprising
a plurality of unit multicore fibers each including:
a plurality of core portions; and
a clad portion which is formed in an outer circumference of the core portions and has a refractive index lower than a maximum refractive index of the core portions, wherein
the plurality of the core portions have substantially same refractive index profile and different group delays at same wavelength in same propagation mode,
wherein the core portions of the multicore fiber are configured so that the core portions of the plurality of the unit multicore fibers are connected in cascade, a maximum value of differential group delays between the core portions of the multicore fiber is smaller than a reduced value of a maximum value of differential group delays between the core portions of each unit multicore fiber as a value in terms of a length of the multicore fiber.

2. The multicore fiber according to claim 1, wherein the maximum value of the differential group delays between the core portions of the multicore fiber is smaller than 5 ns over the entire length.

3. The multicore fiber according to claim 1, wherein, in the unit multicore fiber, a refractive index profile of the core portion is set so that a single propagation mode exists at a wavelength of input light, and the differential group delay is a differential group delay in the single propagation mode.

4. The multicore fiber according to claim 1, wherein, in the unit multicore fiber, a refractive index profile of the core portion is set so that propagation modes of an LP01 mode and an LP11 mode exist at a wavelength of input light, and the differential group delay is a maximum differential group delay in the propagation mode at the same wavelength.

5. The multicore fiber according to claim 1, wherein the core portions of the unit multicore fiber include a center core portion which has the maximum refractive index and has an α-powered refractive index distribution profile, an inner core layer which is formed in an outer circumference of the center core portion and has a refractive index being substantially the same as the refractive index of the clad portion, and an outer core layer which is formed in an outer circumference of the inner core layer and has a refractive index being lower than the refractive index of the clad portion.

6. The multicore fiber according to claim 5, wherein the refractive index profile of the unit multicore fiber is set so that relative refractive-index differences (%) of the center core portion, the inner core layer, and the outer core layer to the clad portion are in a range of ±0.05%, radii (μm) of the center core portion, the inner core layer, and the outer core layer are in a range of ±0.5 μm, and an α value of the center core portion is in a range of ±0.3.

7. The multicore fiber according to claim 1, wherein the core portion of the unit multicore fiber is arranged at positions in a distance of 45 μm or less from the center of the clad portion to the center of the core portion.

8. A method of manufacturing a multicore fiber, comprising:
preparing a plurality of unit multicore fibers including a plurality of core portions and a clad portion which is formed in an outer circumference of the core portions and has a refractive index lower than a maximum refractive index of the core portions, the plurality of the core portions having substantially the same refractive index profile and different group delays at the same wavelength in the same propagation mode; and
manufacturing the multicore fiber by connecting the core portions of the plurality of the unit multicore fibers in cascade,
wherein the core portions of the plurality of the unit multicore fibers are connected in cascade so that a maximum value of differential group delays between the core portions of the multicore fiber is smaller than a reduced value of a maximum value of differential group delays between the core portions of each unit multicore fiber as a value in terms of a length of the multicore fiber.

9. The method of manufacturing a multicore fiber according to claim 8,
wherein, in the preparing, the plurality of the unit multicore fibers are formed by cutting an original multicore fiber which is manufactured with lines being continuously drawn, and
wherein, in the manufacturing, the unit multicore fibers are connected in cascade by rotating a certain unit multicore fiber among the unit multicore fibers around an axis with respect to another unit multicore fiber.

10. The method of manufacturing a multicore fiber according to claim 8,
wherein, in the preparing, the plurality of the unit multicore fibers are formed by cutting an original multicore fiber which is manufactured with lines being continuously drawn, and
wherein, in the manufacturing, the unit multicore fibers are connected in cascade by reversing a certain unit multicore fiber among the unit multicore fibers in a longitudinal direction with respect to another unit multicore fiber.

* * * * *